US010025491B2

(12) United States Patent
Lerner et al.

(10) Patent No.: US 10,025,491 B2
(45) Date of Patent: Jul. 17, 2018

(54) SOCIAL MESSAGING SYSTEM FOR REAL-TIME SELECTION AND SORTING OF PHOTO AND VIDEO CONTENT

(71) Applicant: PIQPIQ, Inc., San Francisco, CA (US)

(72) Inventors: Edward Adam Lerner, San Francisco, CA (US); Joseph Adam Lerner, San Francisco, CA (US); Arthur Wayne Min, San Carlos, CA (US); Miles Gabriel Kattwinkel Ceralde, San Francisco, CA (US)

(73) Assignee: PIQPIQ, Inc., San Francisco, CA (US)

(*) Notice: Subject to any disclaimer, the term of this patent is extended or adjusted under 35 U.S.C. 154(b) by 123 days.

(21) Appl. No.: 14/998,106

(22) Filed: Dec. 23, 2015

(65) Prior Publication Data

US 2016/0188153 A1 Jun. 30, 2016

Related U.S. Application Data

(60) Provisional application No. 62/244,567, filed on Oct. 21, 2015, provisional application No. 62/098,279, filed on Dec. 30, 2014.

(51) Int. Cl.

| G06F 15/16 | (2006.01) |
| G06F 3/0488 | (2013.01) |
| H04L 12/58 | (2006.01) |
| G07C 13/00 | (2006.01) |
| G06F 3/0482 | (2013.01) |
| G06F 3/0484 | (2013.01) |
| G06Q 10/08 | (2012.01) |

(52) U.S. Cl.
CPC .......... *G06F 3/0488* (2013.01); *G06F 3/0482* (2013.01); *G06F 3/04842* (2013.01); *G06Q 10/08* (2013.01); *G07C 13/00* (2013.01); *H04L 51/32* (2013.01)

(58) Field of Classification Search
CPC .. G06F 3/0488; G06F 3/0482; G06F 3/04842; G06Q 10/08; G06C 13/00; H04L 51/32
See application file for complete search history.

(56) References Cited

U.S. PATENT DOCUMENTS

| 9,501,758 B2* | 11/2016 | Roberts | H04N 7/17318 |
| 2009/0300525 A1* | 12/2009 | Jolliff | H04M 1/72544 |
| | | | 715/764 |
| 2013/0019193 A1* | 1/2013 | Rhee | G06F 3/0486 |
| | | | 715/769 |
| 2014/0173501 A1* | 6/2014 | Wu | G06F 3/04842 |
| | | | 715/781 |
| 2014/0278786 A1* | 9/2014 | Liu-Qiu-Yan | G06Q 30/0201 |
| | | | 705/7.32 |
| 2015/0106236 A1* | 4/2015 | Morris | G06Q 50/01 |
| | | | 705/26.64 |

(Continued)

*Primary Examiner* — Jonathan A Bui
(74) *Attorney, Agent, or Firm* — Carr & Ferrell LLP

(57) ABSTRACT

Systems and methods for implementing a social messaging network are provided herein. In some embodiments, a method includes hosting a social messaging network, receiving a contest from a sender client device, generating a set of answer objects having a visibility region and a tap region, sending instructions for generating a graphical user interface to a recipient client device, displaying the set of answer objects on the graphical user interface, and receiving feedback from the recipient client device.

19 Claims, 14 Drawing Sheets

(56) References Cited

U.S. PATENT DOCUMENTS

| | | | |
|---|---|---|---|
| 2015/0120718 A1* | 4/2015 | Luo | G06F 17/30699 |
| | | | 707/728 |
| 2015/0242061 A1* | 8/2015 | Patel | G06F 3/017 |
| | | | 715/765 |
| 2015/0262499 A1* | 9/2015 | Wicka | G06Q 50/22 |
| | | | 705/14.27 |
| 2016/0188181 A1* | 6/2016 | Smith | G06F 3/048 |
| | | | 715/765 |
| 2016/0371751 A1* | 12/2016 | Cohen | G06Q 30/0277 |
| 2017/0161685 A1* | 6/2017 | Jennings | G06Q 10/1053 |
| 2018/0067641 A1 | 3/2018 | Lerner et al. | |

* cited by examiner

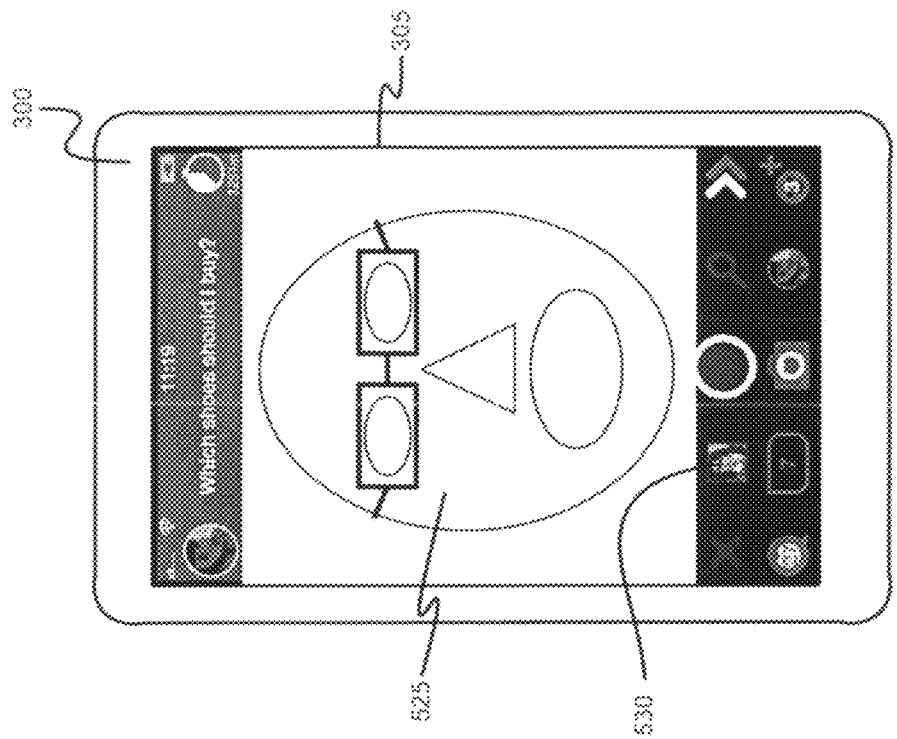
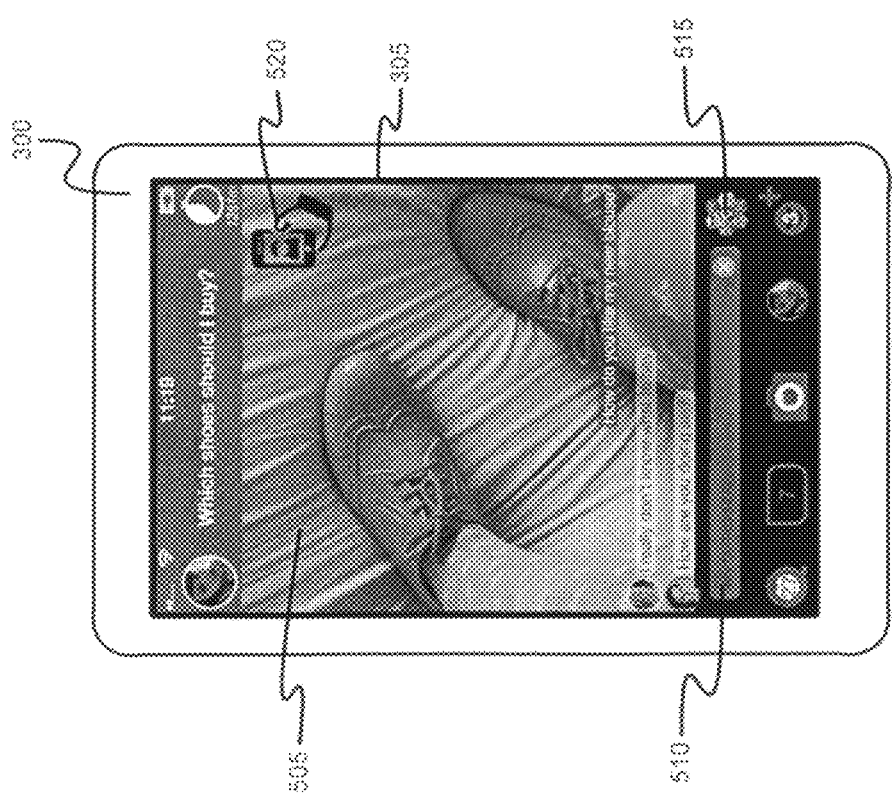
FIG. 5B
FIG. 5A

SOCIAL MESSAGING SYSTEM FOR REAL-TIME SELECTION AND SORTING OF PHOTO AND VIDEO CONTENT

CROSS REFERENCE TO RELATED APPLICATIONS

This application claims the priority benefit of U.S. Provisional Application Ser. No. 62/244,567, filed on Oct. 21, 2015, entitled "Social Networking Application for Real-Time Selection and Sorting of Photo and Video Content;" and U.S. Provisional Application Ser. No. 62/098,279, filed on Dec. 30, 2014, entitled "A Social Networking Application for Real-Time Selection and Sorting of Photo and Video Content," which are hereby incorporated by reference herein in their entirety, including all references cited therein.

FIELD OF THE INVENTION

The present technology is directed to a social messaging network, and more specifically, but not by limitation, to systems and methods for implementing a social messaging network that enables real-time selection and sorting of photo and video content.

BACKGROUND

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

A wide variety of methods are used for asking questions and surveying groups of individuals, friends and communities. Many individuals poll their friends on a daily basis, and those polls have a direct impact on the decisions they make. On a larger scale, marketing research often utilizes surveys of individuals to obtain information about the marketplace. These polls and surveys have traditionally been done either verbally or through the mail. Although, with the rise in networking technology, many individuals and researchers have taken to email or other social network applications to ask their questions. However, email and current social network applications suffer from difficulties in collecting and analyzing survey data in real time, and providing for intuitive ways to poll and interact with various media content. Although various solutions have been proposed, none effectively enable the intimate communication of a messaging system with the scalability of a social network.

SUMMARY

This summary is provided to introduce a selection of concepts in a simplified form that is further described in the Detailed Description below. This summary is not intended to identify key features or essential features of the claimed subject matter, nor is it intended to be used as an aid in determining the scope of the claimed subject matter.

One or more embodiments of the subject disclosure provide for systems and methods for implementing a social messaging network that enables real-time selection and sorting of photo and video content. The methods may comprise: hosting at least one social messaging network; receiving a question from a sender client device; generating a set of answer objects; each answer object having a visibility region and a tap region; sending instructions for generating a graphical user interface to at least one recipient client device; displaying the set of answer objects on the graphical user interface; and receiving feedback from the at least one recipient client device.

In certain embodiments, users may eliminate or remove entries using a pinch-to-zero hand gesture. The user will touch the entry on a touch screen display on a user client device with two fingers, then pinch their two fingers together until they touch. The system will detect a distance between each finger, detect if the distance decreases below a minimum threshold value, and remove the entry from the display of the user. In certain embodiments, a sound effect is played upon elimination of an entry. In some embodiments, the system stores a record associated with each entry for the number of users who have eliminated that entry. If a user has eliminated a particular entry, the system will reduce further notifications and messages to that user in regards to that entry.

In various other embodiments, a user may rate an entry by tapping or clicking on a tap region of the entry on the user client device, the tap region having a plurality of rating regions. The plurality of rating regions may be in the form of a vertical scale, such that to give a high rating, the user taps a high part of the entry and to give a low rating, the user taps a low part of the entry.

In still other embodiments, users may provide feedback on an entry in the form of a photo or video called a reaction shot. In response to a user selecting a reaction shot option, the system will record an object ID that the reaction shot corresponds to, receive a photo or video from the user client device or camera, and send a user ID associated with the user, the object ID, and the reaction shot to a database or server. Other users who are enabled to see the contest or entry may then view the reaction shot.

In further embodiments, messaging interfaces and group icons are uniquely distinguished from other messaging interfaces and icons respectively. Each messaging interface includes a large background image that corresponds to that particular messaging interface, such that a user will not mistakenly type into the messaging interface under the false belief that it is a separate messaging interface. In addition, group icons include a mark and a count indicator that reflects the number of members contained within a group associated with the group icon. The mark and count indicator distinguish the group icon from an icon representing an individual user.

In further still embodiments, a user will double tap an entry on a user client device having a touch screen display to toggle a vote or like. The system will detect a selected entry displayed on the touch screen display at the location of the double tap, retrieve a first entry from a database associated with the selected entry, and store an opposite second entry from the first entry to the database. In another embodiment, the system will detect a user avatar object displayed on the touch screen display at the location of the double tap, determine an object ID of the user avatar object, and transmit the object ID to a first list stored as a table in a database.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

FIG. 5A depicts another embodiment having a chat window and a background image.

FIG. 5B depicts another embodiment for providing a user's reaction.

DETAILED DESCRIPTION

Figure 1:
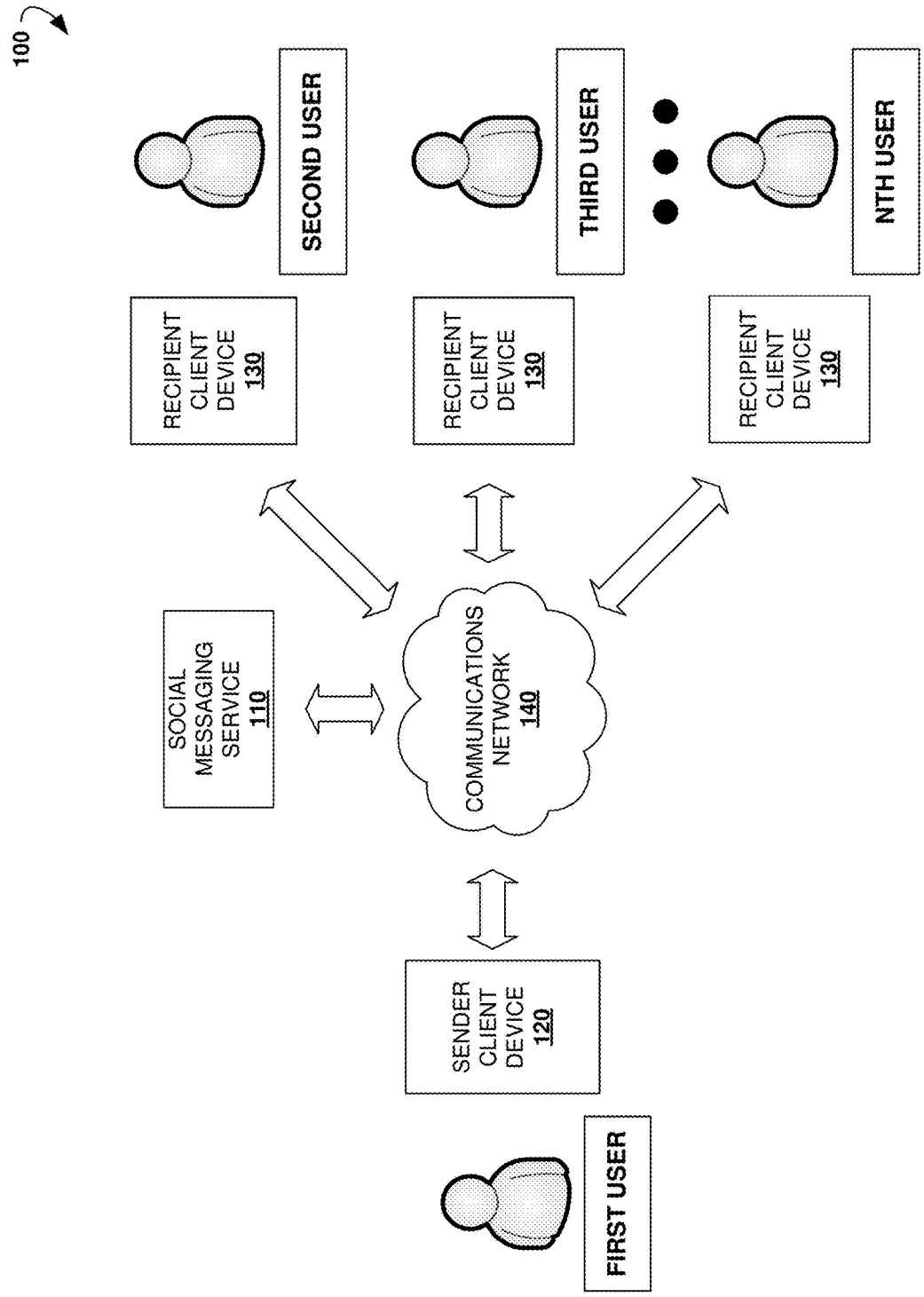
FIG. 1 shows a high-level block diagram of a social messaging network.

The following detailed description includes references to the accompanying drawings, which form a part of the detailed description. The drawings show illustrations in accordance with exemplary embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

The techniques of the embodiments disclosed herein may be implemented using a variety of technologies. For example, the methods described herein may be implemented in software executing on a computer system or in hardware utilizing either a combination of microprocessors or other specially designed application-specific integrated circuits (ASICs), programmable logic devices, or various combinations thereof. In particular, the methods described herein may be implemented by a series of computer-executable instructions residing on a storage medium such as a disk drive, or computer-readable medium. It should be noted that methods disclosed herein can be implemented by a computer (e.g., a desktop computer, tablet computer, laptop computer), game console, handheld gaming device, cellular phone, smart phone, smart television system, and so forth.

The embodiments described herein relate to computer-implemented methods for implementing a social messaging network that enables real-time selection and sorting of photo and video content. The social networking service allows users to view and vote on photos and short videos. Users, or creators, may initiate contests comprising one or more video or photo entries, or shots. A contest may include a title or question, one or more answers (contest entries called shots), a send-to list, a start and an end time, etc. Contests may be in the form of a picture question. The video or photo entries may be created and submitted by the initiating user and other users. During the duration of the contest, users can up-vote or down-vote each video or photo entry, or refrain from voting on an entry. Entries will be promoted or demoted depending on a combination of factors, including, but not limited to, the number of up-votes and down-votes each entry receives, the percentage of viewers who have casted a vote, and the number of eliminations each entry receives. Entries are promoted or demoted in real time as users cast their votes.

FIG. 1 illustrates a high-level block diagram of an exemplary social messaging network 100 having a social messaging service or system 110, at least one sender client device 120 (e.g. first user), at least one recipient client device 130 (e.g. second user, third user, to Nth user) and a communications network 140. In general, the client devices 120, 130 may relate to a wide range of electronic devices including, but not limited to, a smartphone, computer, desktop computer, laptop computer, tablet computer, PDA, wireless telephone, cellular phone, television system, remote controller, gaming console, gaming pad, in-vehicle computer, infotainment system, smart home computer, smart watch, wearable computing device, and any other suitable electronic device having at least one processing or computational unit. In various embodiments, the client device may be equipped with a digital video camera configured to capture digital media such as photo and/or video and to transmit the digital media to a remote location. In addition, the client device may have various input/output devices for interactions with a user, including but not limited to a touch screen display, keyboard, key pad, trackball, touchpad, display, monitor, television, projection system, augmented or virtual reality system, or other suitable input/output device.

Furthermore, each of the sender client device 120 and the recipient client devices 130 may run dedicated software allowing it to practice the principles of the present disclosure. In an example, sender client device 120 may run a dedicated mobile application enabling communication with the social messaging system 110 and other recipient client devices 130 through the communications network 140. While client devices 120, 130 are shown as being associated with a sender client device and one or more recipient client devices, it is to be understood that a single instance of the dedicated software may act as both a sending client device and a recipient client device.

Each client device 120, 130 comprises an application having non-transitory computer readable instructions that, when executed by one or more processors, causes the client device 120, 130 to perform various methods. Such methods may include, but not by limitation, displaying graphical user interfaces, receiving input from the user, transmitting contests and information to one or more other client devices 120, 130 or the social messaging service 110, and receiving contests and information from one or more other client devices 120, 130.

The social messaging service 110 is connected to the client devices 120, 130 through the communications network 140. The social messaging service 110 may comprise a server or cloud application in contact with a database or storage and various other service computer programs.

The communications network 140 can be a wireless or wire network, or a combination thereof. For example, the network may include one or more of the following: the Internet, local intranet, PAN (Personal Area Network), LAN (Local Area Network), WAN (Wide Area Network), MAN (Metropolitan Area Network), virtual private network (VPN), storage area network (SAN), frame relay connection, Advanced Intelligent Network (AIN) connection, synchronous optical network (SONET) connection, digital T1, T3, E1 or E3 line, Digital Data Service (DDS) connection, DSL (Digital Subscriber Line) connection, Ethernet connection, ISDN (Integrated Services Digital Network) line, cable modem, ATM (Asynchronous Transfer Mode) connection, or an FDDI (Fiber Distributed Data Interface) or CDDI (Copper Distributed Data Interface) connection. Furthermore, communications may also include links to any of a variety of wireless networks including, GPRS (General Packet Radio Service), GSM (Global System for Mobile Communication), CDMA (Code Division Multiple Access) or TDMA (Time Division Multiple Access), cellular phone networks, GPS, CDPD (cellular digital packet data), RIM (Research in Motion, Limited) duplex paging network, Bluetooth radio, or an IEEE 802.11-based radio frequency network.

Figure 2:
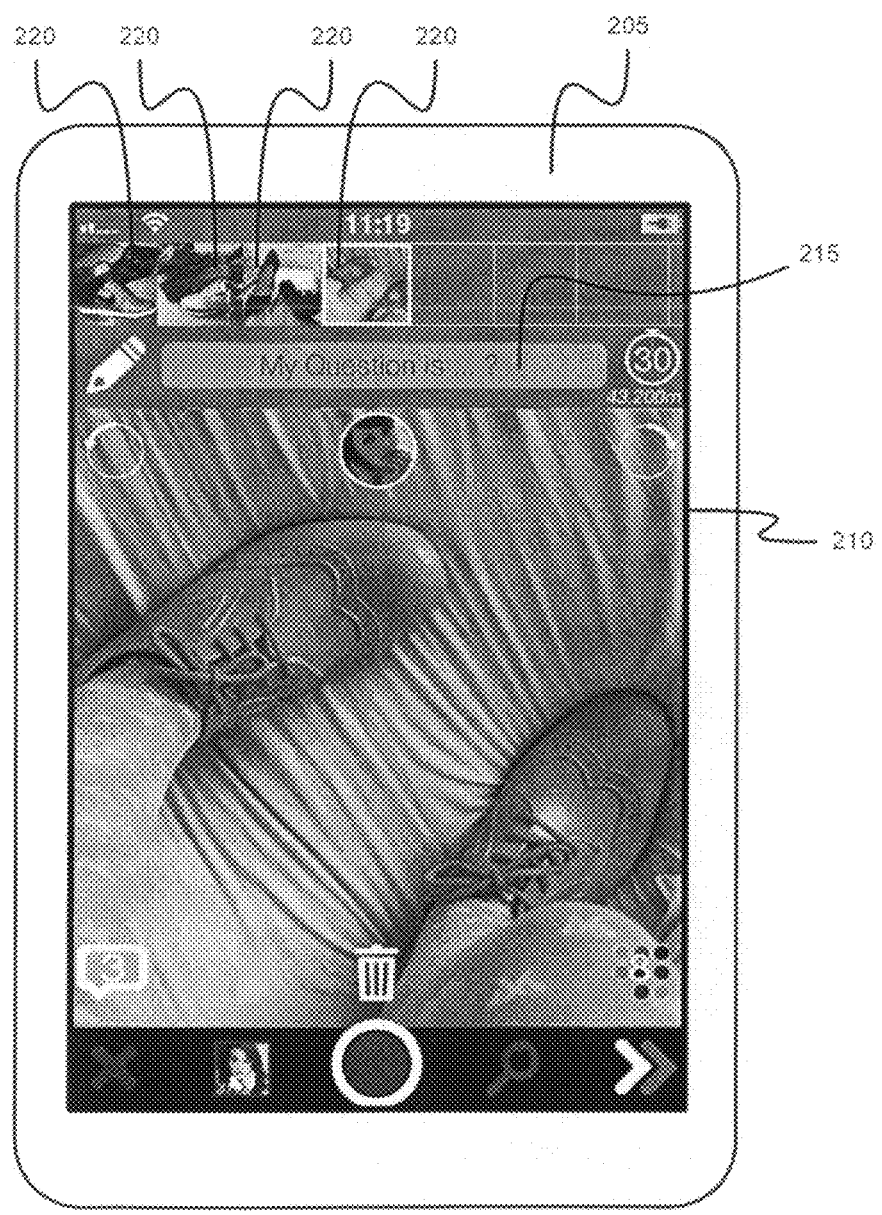
FIG. 2 depicts a graphical user interface for a user device in accordance with an example embodiment.

FIG. 2 depicts an exemplary contest initiation interface, or graphical user interface 210 displayed on a user client device 205, having a question input 215 and a plurality of entry or answer objects 220. A contest comprises a question and a set of answers or entries, and may further include a title, a send-to list, a start and an end time, etc. The contest further comprises a unique contest ID that facilitates the retrieval of information from a database or storage. Contests are either public, private or semi-private contests, and either open or closed, and may be in the form of a geo contest, long contest, recurring contest, real-time contest, news contest, or other suitable contest that will be described in greater detail herein below.

A user initiates a contest by asking a question and uploading a set of entries. The question is entered into the graphical user interface 210, as shown by exemplary question input 215. Question input 215 is in the form of a text input element, but could also be a photo or video input element. Each entry is in the form of the entry or answer objects 220. The entry objects 220 have a digital image, video or other form of digital media or information. The entry objects 220 are generally rectangular in shape, but could also take on any suitable size or shape. Each entry object 220 has a visibility region and a tap region, the visibility region encompassing an area of the digital media that is visible when displayed on the graphical user interface 210 and the tap region encompassing an area of the digital media that registers taps on the client device 205.

A tap, click or contact may refer to a touch screen tap, long tap, double tap, mouse click, double click, long click, eye tracker or other suitable human machine interaction that indicates an intention of a user. In some embodiments, user input is a hand gesture, as will be described in greater detail below.

After the user initiates the contest, information associated with the contest, including the question, the set of entries, etc., is sent over the communication network 140 to the social messaging service 110 and stored in a database or memory. The social messaging service 110 then determines whether to show the contest to one or more additional users, or recipient users through recipient client devices 130, using a statistical algorithm. The recipient users may then up-vote, down-vote, like, unlike, comment on, or altogether remove entries.

The statistical algorithm takes into account factors including, but not limited to, the following: the relationship between the contest initiator and the user; the geographical proximity between the contest initiator and the user; the proximity in age between the contest initiator and the user; overlap in group membership (e.g., schools, clubs, or workplaces) between the contest initiator and the user; the time at which the contest was initiated; historical data of the user's activities (e.g., other contests the user has previously voted on, any tags the user is currently following); and the popularity of the contest among users. The popularity of a contest is based on a combination of factors, including, but not limited to, the number of users who have voted on the contest, the number of users who have ignored the contest, and the number of users who have unfollowed the contest.

Public Contests

Open public contests are user (creator) or system generated contests that are sent to a large number of recipients based upon the statistical algorithm. The system may leverage both geo (geography) and demo (demography) to help build communities of voters. Public contests may be sent to a first number of users, to test their worthiness or quality, or Q-rating. First, the system attempts to send the contest to all the friends of the creator. The system may also give the creator the option to send it to his or her other contacts, or to offline user contacts via email, SMS, MMS or other suitable messaging method. Then (aiming to get to a first quota of users), the system sends it anyone else who matches the self-described age/grade preference of the user who is also online. Age-Grade is determined by asking the question, —"Which grade or life status are you most interested in?" If there are not enough exact demo matches, the system increases the age cohort by one and tries again, then decreases the age cohort by one, and tries again, and repeats this older/younger pattern until the system has sent the contest to the first number of viewers.

If there are too many matches within an age-grade, the system sends the contest to nearest user matches who belong to 2-4 geos (home, work, school, and current location) of the creator. The system samples a geo location of a user when the user sends or receives contests, and randomly when not actively running the application. The system uses this to determine the 2-4 geos by time: home (12 am-8 am), work (9 am-6 pm), school (from 9 am-11:30 am, 1:30 pm-3 pm), and here (where the user is now). The system may let the user manually set their home, school and work geos. Alternatively, the system may use a global positioning system ("GPS") or other location tracking device of a user client device to determine the home, work, school and current location, or other appropriate geo location. After a certain number of days of no-show in a geo, the manual setting expires.

The system may incorporate age or grade cohorts. If a user has a younger age, the age of contest creators will matter more. If a user is younger than twenty-five, the system will ask what grade they are in (and then promote them in the summer) and what school they attend. A false school or age means that user will miss some relevant contests, and will be fed a lot of irrelevant contests. In response, the system will give users an easy mechanism to correct and tell the system their real grade or school. When they are mismatched with friends and contest invites, the system may subtly and gently encourage them to help fix either the grade of their friends or their own. The system may create a "match self or friend to grade" contest. The system may re-ask school as they graduate. As a rough estimate, age cohorts are single grade through grade 12 (in the USA, for example).

Assuming there are enough entries a large contest will bubble up in a set of rounds: Round one faces off the entries from a particular grade cohort at a particular school or neighborhood; Round two faces off about tens of schools or neighborhoods; Rounds three and four build to a state faceoff (Up to one hundred counties); Rounds five and six build to a national faceoff (fifty states plus a couple territories); Rounds seven and eight build to a global faceoff (one hundred countries). It is to be understood that the rounds may be arranged with any suitable group or size of ages, grades, geographies, or other qualification.

The contest can appear in multiple ladders (each with their own winners), a school ladder and a neighborhood ladder, or a single age ladder and an all age ladder. The system may suggest a preferred ladder to the user. For example, parents might prefer all grade contests, and students might not.

The contest may be a team or round based contest. Contests may include dance-offs, rap-duels, or other team or turn-based contests. In a rap battle, all sides present their round one rap in contest one. The person or team that comes in first gets one point, the next team two points, etc. Then each side presents their round two rap in round two, and the winners and points are added. Like a cross country race, the team with the least points wins. This method could be used to make contests a team sport, with each participant responsible for one (or more) entry rounds. When the focus is on person versus person, a single face-off is too short and too tame to really capture the rivalry. This requires a linear series of contests, each one entry tagged with a particular #team, with all ranks for a team added up in the final round.

All large contests are split by age cohorts and geo-regions. If there is not enough interest in the contest (too low response rate), it will stall before it reaches the global level. If a geo or age cohort stalls, it may merge into the next closest geo or age group.

Public contests are grouped together in a feed under headers: Public contests from friends and Public contests (age-grade X). By clicking or tapping on the age-grade, the user can change her/his age-grade preference. The age-grade preference is displayed in a user profile and to friends of the user. Every twelve months (on July 1), the system will notify the user it will increment by twelve months.

For exemplary purposes only, sample contests may include cool people or places contests, official contests, school contests or news contests. Cool people or places contests are contests created by users with a special privilege (official cool people or owners of cool places). They can set the contest for a particular range of geographies and age-grades.

Open public contests are likely to generate too many entries to fit into a single contest. In that case the entries are organized into ladders, which group approximately ten entries to find a best of ten. The winner then goes again up to ten other best of ten entries. As many levels as necessary can be filtered until there is a single winner. The ladders may organize a large number of entries into groups of varying size and execute any suitable number of levels to determine a winning entry.

Big contests are split into geo contests that split contests by area or region to increase relevance. Users will be more interested in contests that involve the school or neighborhood of the user, and in smaller contests that are more feasible to win. For instance, a four level contest increases the chance of winning of a contestant by four orders of magnitude. Furthermore, geo contests force everything to go through a reasonable filter. Amazing content (one in a million) will easily pass the first few levels of geo filters. The fact that good but non-amazing things may or may not be spotted at geo level one or two is far superior than no filtering at all. By the city or state level, the system should have largely solved any problem of an overabundance of low quality content.

Geo contests are the primary form of multi-level or ladder contests. The geo contest starts off at a small scale, near a school for example. A winner of the first level gets promoted to the second level, such as a school district, then, in contests of increasing order of geographical size, a county, ten counties, a state, a regional encompassing ten states, a national, a continental and then a global. As each contest may only hold a small number of entries, such as ten entries, essentially the system will make a power-of-ten contest, sorted by location. The system may geo-organize each city/state/country, and may be assisted by trusted users.

Geo-regions are hierarchical; with the next size up roughly ten times the population or other suitable method of grouping geo-regions. Geo-regions may remain static over time. If a region has few users, it will be relatively easy to win that level of the geo-contest, which will encourage participation from that area. Hierarchies may apply to other suitable categories, like schools, age, clothing, sports, etc. Hierarchies may also be tagged (e.g. #sports#baseball#sfgiants#player name).

For the smallest geo, level one, after a particular number of views, for example thirty views, entries need Q>10% to survive, where Q is the ratio of up-votes to views. After a greater number of views, one hundred views for example, if an entry in a first level (smallest geo) has a higher Q rating than the lowest Q rating in the next higher hierarchy, then that lowest Q rating entry disappears and is replaced with the new higher Q entry. The system may promote a contest out of a second level if the contest exceeds an even greater number of views, such as four hundred views. For example, the third level may need sixteen hundred views, the forth level sixty-four hundred views, and a multiple of four for each additional level.

The lowest level contests may fail or promote entries at roughly the same pace as new entries are added to ensure equilibrium of contests. Though the rate of promotion depends on user activity, the system may increase the rate of failure for the lowest level contest. If there are more than a threshold number of entries in a level one contest, then the system may remove the lowest Q entry of the entries from the entries in the top five (of ten) views, for example. However, this heuristic is not useful if the system gets a burst of contest entries. In that case, the system may split the contest in multiple contests. If the system is eliminating entries with fewer than ten views, it may instead split them into a new contest.

Public contests can either be unqualified or qualified. Unqualified contests are open to anyone. Qualified contest are only open to participants who meet certain qualifications, like school, location, or grade. Grade is initially established by asking the question: "What grade are you most interested in following?" It is automatically increased on July 1. Location is established by bringing the client device into that location during appropriate hours. Furthermore, all public contests are categorized. The system may run contests to add categories. To start, a contest has a primary category, but it may further have a secondary or tertiary category.

Contests may have various setting configurations, including max shots, or the maximum number of entries for a particular contest, and end-time. Having a max shot limit of twelve would enable the system to allow users to pick the best of a year from each of twelve monthly bests. In the course of running contests, the system will find the optimal contest size, which will influence how geo or other hierarchies are built, and influence the max size. Furthermore, by default, contests end the earlier of the end-time or when all possible responses are in (which occurs frequently in one, two or three person contests). Contests are by automatically shuffled for each voter to provide better statistics by default. However, creators may check an order button if the shots need to be presented in order.

News Contests

News contests are continuous open public contests. First, the system will create a geo hierarchy for an area. The system may have between two thousand and six thousand users per lowest level geo, or other suitable range of users. The system may have one higher-level geo for every subset of lower level geos, 3-12 geos for example. Users cannot create news contests; they can only respond to them. Every user will always have a news section in their contest in their feed (unless they hide it—then it will not reappear for twenty-four hours). The news section will contain one contest per level. If the system has five levels of geos, then the news section will contain five contests (unless the user temporarily hides some).

Furthermore, the system is particularly suitable to be popular for breaking news, globally. Breaking news is unusual in that it is global and continuous. Breaking news is also highly asymmetric, with an unusually high ratio of consumers to producers. First, the system will look at breaking news from a point of view of a consumer. Breaking news, like any other contest, will get pushed into a user feed if the system calculates that it is worth pushing. This depends on the interest of the user in news (that is contests tagged news), nearness, newness, and the popularity of the news with similar people (same age, same home town, same school, etc.). For example, the system may send all users a 'Breaking News' open geo contest every twenty-four hours. It will gradually change in frequency depending on how often they interact with it. The user may then see something news worthy, take a shot of it, and add it to the contest.

Triage Rules

Public contests are triaged. If after being sent to the first number of users, if the ratio of voters to viewers has dropped to under 5%, or other suitable percentage, the contests stop being sent. Otherwise, the contests are sent to the next number of viewers and must hit 6%, and so on up to all users. If this sends too many contests, then the system will increase the threshold. In theory, a popular contest can spread to every age-grade user of the system. This method removes bad contests as quickly as possible. This method also spreads the best contests as widely as possible. The system will shoot for a roughly 50%/50% division of sending top contests, and testing random conferences. As the system gathers data, it can modify a heuristic to fit the 50/50 goal.

Official contests can override the triage rule with their own criteria. Official contests can be sent to a particular range of age-grades, each with 1-N viewers with a minimum voting percentage. The system may brand official contests a bit differently (colors, fonts, oversized official portrait, etc.). For example, a school contest may be an official contest. If a day location of a user corresponds to a school in the database of the system, and the age-grade of the user is set to match the age-grade of the school, the system may ask the user if he or she goes to that particular school. Then, the system may add the option of sending a contest to that school. Unlike normal public contests, school contests will not match home, work or here geos, and will be limited to the age-grades of that school.

To start, public or semi-private contests are not sent to everyone, only to enough online users to collect initial interest stats on that contest. The system will send the contest only to the people most likely to appreciate it. As soon as that contest is visible to online users, the system will start collecting stats on it. The system will add it to more feeds if the system determines it is good, or push it down or off the bottom of some feeds if the system determines it is bad. As such, bad contests can get removed fairly quickly.

User Feed

Contests that are displayed on a feed of a user depend on a calculation threshold. Only contests above the threshold are shown depending on a combination of factors, including, but not limited to, a school of the user, an age-sex cohort, a work geo-region or home geo-region, a current location of a user, a list of contests the user follows, and a list of contests the system statistically determines the user may prefer. By default, the user may follow friends, school, users nearby, work, home, same age-sex, etc.

The system may also prioritize preferences of the user, in the following order: friends, co-members of groups, categories the user follows, recommendations and/or advertisements. The system may use the preferences in any suitable order, or allow the user to modify their own preferences, such that the user is not burdened by clearing their daily content feed. The system may delete all but the exceptional posts daily. The system may show all requests from friends, unless the user clicks on a "don't show all requests" button, or the system may trim the worst requests group co-members, and trim below average requests from those the user is following and limit the number of suggestions. If the user empties their feed, the system may recommend or enable search for additional follows, likes or interests.

The default priority is: contests of friends; semi-private contests; and then public contests. The system will learn how to prioritize contests by watching real behaviors and adjusting ranking algorithms accordingly. The system, by default, may prioritize: contests of friends over semi-private contests, a semi-private over public; 'brand new' and 'about to expire' contests; contests from Famous contest creators specific to a history of the user of joining (or hiding) the contests of that creator; contests near the user; contests in an age cohort of the user; contests from administrators at various levels of priority; and tags/flags or the lack thereof that might affect priority. As contests start and end, get up and down voted, viewed or removed, the system will adjust the estimated interest and may move it up or down the feed.

The system can lean on historical estimates of users interest in that category (do they skip 5%, 50% or 95%, for example), and real time estimates of the quality of recent post (are the first ten or one hundred or one thousand other viewers skipping 5%, 50% or 95%, for example). The system will not display posts on the feed that probably are beneath a threshold of the user. For example, the system may allow ten interested followers to view a post, and if it is good enough, allow one hundred followers to view it. If the ratio of posts to reviewers is too high, then the system could initially prioritize by the quality rating of a creator user. The system may use votes and delays to maximize interest and minimize junk. The system may also provide feedback or contests so that all users compete for quality.

The system may push the contests that optimize other goals, such as: giving contest initiators immediate feedback and capturing some eyes on unknown content; promoting the excitement of time running out, that is a contest with just a few minutes left; giving a good experience to new or occasional users; reinforcing connectedness to friends, friends of friends, or users that share place, age and sex/sexual orientation and interests; highlighting what makes the system different, age-relevance, global contests, video, etc.; and encouraging users to explore and experiment. Each contest is a sample of a particular collection of similar contests. Given the choice between pushing to the user another marginal contest in an area of known interest, and a great contest in an area of unknown interest, the second has a much bigger return on investment as it may lead to hundreds or thousands of other interesting contests. Furthermore, the system will recognize that interests change, particularly at life milestones (new schools, new places, marriage, children, etc.) thus the relevance of old matches slowly diminishes.

As a result, the system may: give new content a boost, which decays as the real data shows up; give about to expire content a boost; give new user content a boost, and existing users content a bigger boost the less frequently they initiate; and boost the fitness of matched friends, places, ages, etc. To start, the system may assume that video is better than photos and modify based upon real data, similarly with global contests and age-relevance.

Private and Semi-Private Contests

Only invited users may access private contests. A public contest is accessible to all users. (E.G. Best Christmas tree.) Any user may invite any other user to a public contest. While owners cannot block or ban users from their public contests, they can report them for not following certain terms and conditions. Certain flags may limit users (age restrictions or region restrictions).

Like private contests, semi-private contests are accessible to all invitees. However, unlike either public or private contests, Semi-Private contests, by default, also are restricted by location (home, school or work), restricted by age (an age cohort, if the user is a student), and restricted to friends of any invited user. Contest owners may unlock any of these access restrictions. In addition, by default, any invitee can invite anyone else, though the owner can disable this. Owners can temporarily block users or locations from semi-private contests, or permanently ban users or locations. Semi-private contests may be limited to only be open to certain badge holders or user tags, or specific collections of badges or tags. For instance, only "Trusted Users with French Expert" badges may vote on French localization contests.

Extended or Long Contests

Extended or long contests are contests that have a large amount of entries without a useful hierarchy (e.g. "What is your favorite car" or "Who is your favorite SF Giants player"). The system may have a test or power tool that imports many shots into a contest. As the system keeps attempting to add more entries to the same contest, the contest extends into a series of connected contests. For example, with one hundred entries and a twelve-item limit, the system will end up with a contest with eight groups of twelve, and one group of four. Therefore, nine new contests show up in the user feed.

An extended contest links multiple contests together. While the simplest display of nine linked contests would be a stacked feed of nine contests, it may be displayed as an 'extended contest'. That is, the system shows only the next two parts (first and second to start), then inserts the next part as one of the first or second gets cleared. Instead of seeing nine items in the user feed, the user will see only two and the system may display a special indicator to reveal that more items are available.

Linked contest can be set to either continuous or discontinuous mode. Discontinuous mode is normal. The user participates in one contest in the chain, then the next, etc. Continuous contests connect via the next and back mechanisms smoothly. This allows the creation of extended entries by a series of fifteen-second entries. The extended contest shuffles across all groups in a round, not simply within a single group (as this would provide too much data on group one, too little data on group ten, etc.).

Extended contests are Multi-round. Winners of the first round are promoted into the second round, etc. Round-winners trigger round results. The final-round winners can trigger final results. Voters can vote once per round, though if the voter does not vote in later rounds, and what the voter voted on was promoted, then the voter will default to voting for the same entry. If their choice was promoted then it should sort near the front of the contest (if the voter views the contest).

While upcoming rounds will first appear in a scheduled contest list of the user as they start to populate, the upcoming rounds will not appear in recipient feed until the user is ready to start. As additional winners are determined, the winners are promoted to the next round. The contest name will automatically reflect both round and group, such as "Best Cars Round 2, Group 3." The next round starts (shows up in feeds) as soon as previous round is cleared, unless the rounds are scheduled. In a real-time multi-level contest, all the levels populate together, simultaneously in real time. The power tool could also gather up entries containing a particular tag or flag, such as '#selfie' or '#test1.'

Recurring Contests

Recurring contests may occur on a regular or scheduled basis (e.g. "My best selfie"; "My best profile shot"; "Best soccer shot"). Recurring contests can reoccur daily, weekly, monthly, yearly or on a set schedule. Recurring contests include a start date, end date (or number of recurrences), and a recurrence period. A recurring contest will carry forward all properties of the contest, including the same send-to-list.

The recurring contest may include a reminder. Recurring contest send reminders to their owners. These reminders show up in a message list, and optionally can also be sent as email or calendar events. The reminders may be sent one day before the contest, and contain some information on the contest, including a link to edit or stop the contest. The system can also generate a message that is designed to be forwarded to invite more people to this contest.

Recurring contests may default to the same 'send to' list. The 'send-to' list contains groups, so that as these groups grow the contest grows. Furthermore, the recurring contest automatically generates and runs a time ladder. If a contest reoccurs every day, every week, the system generates a weekly 'best-of' each of the previous seven days, a monthly 'best-of' the previous four or five weeks, and final (for contests with end dates) or yearly (or half or quarter year) 'best-of' previous twelve, six or three months. Yearly contests are rerun every 365.25 days.

Over time the system will collect histories of all recurring contests, and learn how long it takes for open contests to collect enough entries to slowly switch from a contest mostly interesting to contributors, to a contest mostly interesting to voters. Thus, open contests will be more heavily affected by predetermined Bayesian factors (say the performance of previous similar contests) than closed contests. Some care is necessary, as a 'best Halloween costume' contest will vary greatly in interest between just before Halloween and a week after Halloween. Nevertheless, at some point (say one thousand viewers, instead of the one hundred viewers a closed contest may need) the contest score will be largely based on its current performance.

Open Contests

In one embodiment, contest owners can create open contests, a contest which voters are allowed to add an entry or shot. The user generated content is added immediately to the contest. Contest owners may not want to mix their official choices with unpredictable user generated content. In that case, they can set their contest to segregate the user generated content into a second, linked contest. If user generated content gathers enough votes to have a reasonable chance of affecting the winner, the system may schedule a run-off. For example, a user may want to run an open, global 'Best Halloween Costume'—once a year, or 'Best Basketball Play', 'Best Hair' or 'Best Kiss'—daily events. The system starts collecting entries. The system allows users to submit more than one entry, but if so this removes their previous entry.

Real-Time Contests

Real-time contests are contests that allow a voter to vote multiple times on a contest as the entries for the contest change. For example, if a user wants to run a 'best costume' contest on Halloween, the system may allow the user to submit entries or vote repeatedly as the user finds different costumes. The system may watch behaviors of the user to determine the frequency of re-voting. For instance, if the eight of the top ten entries have changed since the last vote of the user, the system may push them to vote again. If the user votes on it, the system may push them another vote when seven of the top ten entries have changed, and so on. If the user ignores the notification, the system will not repeat the notification. If the user continues to vote, the system may slowly increase the frequency of repeat voting opportunities, which the user can always ignore. Each opportunity to vote is also an opportunity to contribute an entry. Furthermore, a real-time contest may have a title with a different prefix or suffix, such as "live" or "real-time." In addition, the contest has a preview image, the preview image may be the best, or most voted, entry.

Voting

A voter can respond to a contest in the following ways: never saw the contest in feed or saw contest in feed; skip contest (never joined the contest); removed contest (a few removed contests may un-follow that type of contest); or join the contest. If a voter joins a contest, they may add a choice, up-vote a choice, remove the contest, down-vote a choice, or remove a choice. Removed contests move from the main feed to a hidden contest list. For example, the average contest may be first sent to the visible page of one hundred users who are running the contest. It may be skipped by eighty, removed or cancelled by five, up-voted and down-voted by ten, and down-voted by five. These numbers may be better if the content was sent by a friend, by a user very close in age, from a very close location, by a link from a previous contest, or from a contest series.

The more up-voted (by a statistically reasonable combination of the percentage of votes of viewers and total votes) an entry is, the wider and more the system will promote it. In real-time or simultaneous multi-level contests, once a round one entry is 'better' than then the worst round two entry, the system will promote it and demote the worst. The less up-voted (or more down-voted) an entry is, the more the system will demote it. If the entry is less up-voted than a predetermined threshold before the next round, the system will remove the entry.

Contest with a high percent of voters adding user generated content may generate too many new entries for meaningful voting. The system may need greater than a particular number of viewers per entry to have some accuracy. If the system is not getting enough votes to triage the entries faster than they come in, then the system may ask users to vote on two or three rounds of entries. The system may also use a fame score or a trust score of the user to further triage user generated content.

Votes determine winners of contests and create interest ratings of contests. To pick a winner, the system may use a simple vote and determine the winner based upon which entry has the most votes.

More sophisticated analysis is possible and useful when the system does not have enough simple votes for statistical validity (for example, less than one thousand votes before round three or four). The system may factor in down voting. As down-votes are intended primarily as a sorting mechanism, it is not as negative as a true down-vote. Some users will down-vote a lot, some a little. The system may weigh the down-vote penalty by a propensity of the user to down-vote. Furthermore, down-voting one shot is 'worse' than down-voting some or all shots in a contest. In addition, voters can vary in trust. New voters may be undependable. Voters who tend to pick items simply by order (say the first item) may be undependable. The system may test the dependability of a voter by occasional voting tests. For example, it may be worse to view a shot and not up-vote it than it is not view a shot and not up-vote it.

To rate contests for interest, the system looks at historical (for recurring or named or tagged contests) and current feedback. The system promotes interesting contests that draw a large number of votes, while demoting boring contests that are either eliminated or have a low number of votes. If a user never votes, always votes or down-votes, this user does not provide quality information, and may be discounted by this factor. For open contests, a user may be more reliable if the user adds entries to the contest.

System Currencies

The system may include various currencies, such as fame, trust, money and bad points. Fame may include points for expanding content, adding good (involved) users or good (involving) user generated content, both contests and entries to other's contests. Famous users get wider initial circulation, higher in search. Winning contests may also bring fame. Trust may include points given out for nurturing content and doing useful contests or community deeds. Trustworthy users may act as jurists on various trials (e.g. bullying trials) or may act as community leaders (e.g. a leader for cars or shoe contests), as well as act as tiebreakers. Money may be awarded or spent for doing various actions on the system. In addition, bad points may exist for each user. Every user has several ratings. When a user gains (or loses) points, the system may need to inform the user of the change and perhaps the reason.

The system may calculate the fame of a user based on the usefulness or publicity of the user. Useful users should gradually get spread more widely; wider ages, wider regions, more loosely friend of friend. Alternatively, bad users should gradually get spread more narrowly. To define good and bad, the system needs to know the standard metrics, which could vary widely by age, friend-closeness, etc. However, once the contest has a statistically valid sample size, it should stand on its own. It will have a certain percentage chance that it is interesting (voted on) by close friends, friends or followers, a certain percentage chance that it is interesting to wider ages, and a certain percentage chance that it is interesting to wider locales. These are used in a Bayesian algorithm to predict optimal contest distribution.

Secondarily, the system will encourage productive involvement. A Fame number can affect initial estimates of a quality of a user vote, and provide feedback to the user, particularly to encourage desired behaviors such as showing up, recruiting and good posts.

An exemplary fame calculator algorithm may be computed as follows: A new user may begin with an initial fame. Various fame modifiers, which either increase or decrease the fame, may be applied based in part upon a combination of various causes including, but not limited to: number of followers, number of friends, number of referred users brought to the system, number of days a user uses the system, each three day set a user does not use the system, each poorly received or bad contest or added entry, each well received or good contest or added entry, and/or each contest or entry voted up by some multiplier as many voters as a median. Furthermore, fame may decline at a predetermined percentage per day. For professional or verified users, other SNS followers may affect the fame score.

The system may also include a reputation of the user, which may increase or decrease depending upon a combination of factors, including but not limited to: a number of friends and followers, learning how the system works and use of the system, winning contests, being hidden, being ignored, being shared, and/or having responses or non-responses.

Verification and Crowd-Sourcing

The system may run contests to self-improve, or to crowd-source improvements of the system. For example, there may be a contest for the best visual indicator for a particular geo-region. Countries and states have flags, but the system may determine what image would work best for a city, neighborhood or school. It might be a map, an iconic image (e.g. the Golden Gate Bridge), a symbol, a mascot (e.g. for a school), or some artistic creation. In this manner, the system will create a contest to determine the best visual indicator that the system will then use for future contests in that geo-region. Another example may include populating a database of words or images to translate or localize.

A further example may be to form a bullying jury. Entries may be flagged for bullying by users. The system may then convene a jury to review the flagged entries and make a determination of bullying, which may then be promoted up to administrators of the system. Another example may include age verification. The system will function better if it knows what grade or age cohort is correct for each user. If friends of the user are significantly age mismatched, then the system could send "who's in $8^{th}$ grade" or "who's not in $8^{th}$ grade" to the people who know. An additional example may be outlier removal. Once the system has good baseline data it may create "worst region flag or name" contests, "worst bully," or "silliest age," to try to fix remaining outliers.

The system builds databases (best contests), and then audits them (worst contests). The system may test users dependability by pushing at them regions to name that the system knows are correct, or other questions, which the system knows the right answer. The system pushes the right contests to the right people, based on real stats.

Furthermore, the system may use contests to learn from users and to teach users. Any user can create an open, public contest, and tag it correctly so that it can be found or followed. Unfortunately, many users may not create the right tags or follow the right tags. In response, the system may teach users (and learn from users) through trial and error. The system may send users various high quality public contests, and watch if the user participates in them or hide them, and thus gradually learn their preferences, or likes and dislikes. The system may even be able to learn how open-minded they are. The system may try to teach users new features, or about features they have not used, by sending them appropriate 'choose your favorite feature', or 'have you tried . . . ' contests. The system may even encourage users to create contests; by messaging them on occasion, perhaps even tied to activity on their client device.

The system may also use language contests to localize content. Between the application, website and emails, the system will have a variety of text, videos with voiceovers and images to localize. The system may use content for localization. The system may utilize willing users commenting, adding content, and tagging and triggering mechanisms to do localization, especially for uncommon languages.

First, the system will to determine which users were willing and able to help. The system could ask users if they wanted to help localize. This could be a simple two picture question vote, yes or no. A yes would add a #wants_to_help_localize tag to that user.

That, in turn, would trigger an English qualification test. A series of multiple part questions presented as votes. If the user votes correctly, the user will be qualified (at some level). This would add a #English=1 tag, or other suitable language tag. Then, the system would find out which language they want to help localize to. The system would send them a contest and ask them to tag it with one of the predefined language tags, or flags. This would trigger a set of qualification tests in those languages. These might add a #Korean=5 tag, for example. Then, the system may send them a variety of different language text images and text to choose 'best' on. These could include both already verified results, and results needing more review. This would further tune the language rating of the user and provide some data. Finally, at some level, the system would let the user add new text choices to the contest. At this point, the user could start suggesting localization of un-translated strings. The system would be handing them points and badges, and including them on a leaderboard, etc. Of course, the user could un-follow the localization contest with the usual un-follow mechanisms, and if the user frequently ignored (or avidly answered) localization contest requests, the system would gradually ramp them down (or up), as with any other contest type/tag.

This powerful form of engagement would also have uses for various high value mechanical tasks, from labeling images, user testing, surveys of all kinds, etc. It is also quite possible that many users might be interested in being tested this way in a variety of subjects, particularly if wrong answers triggered a review and another chance to pick the right answer.

Graphical User Interface

Figure 3:
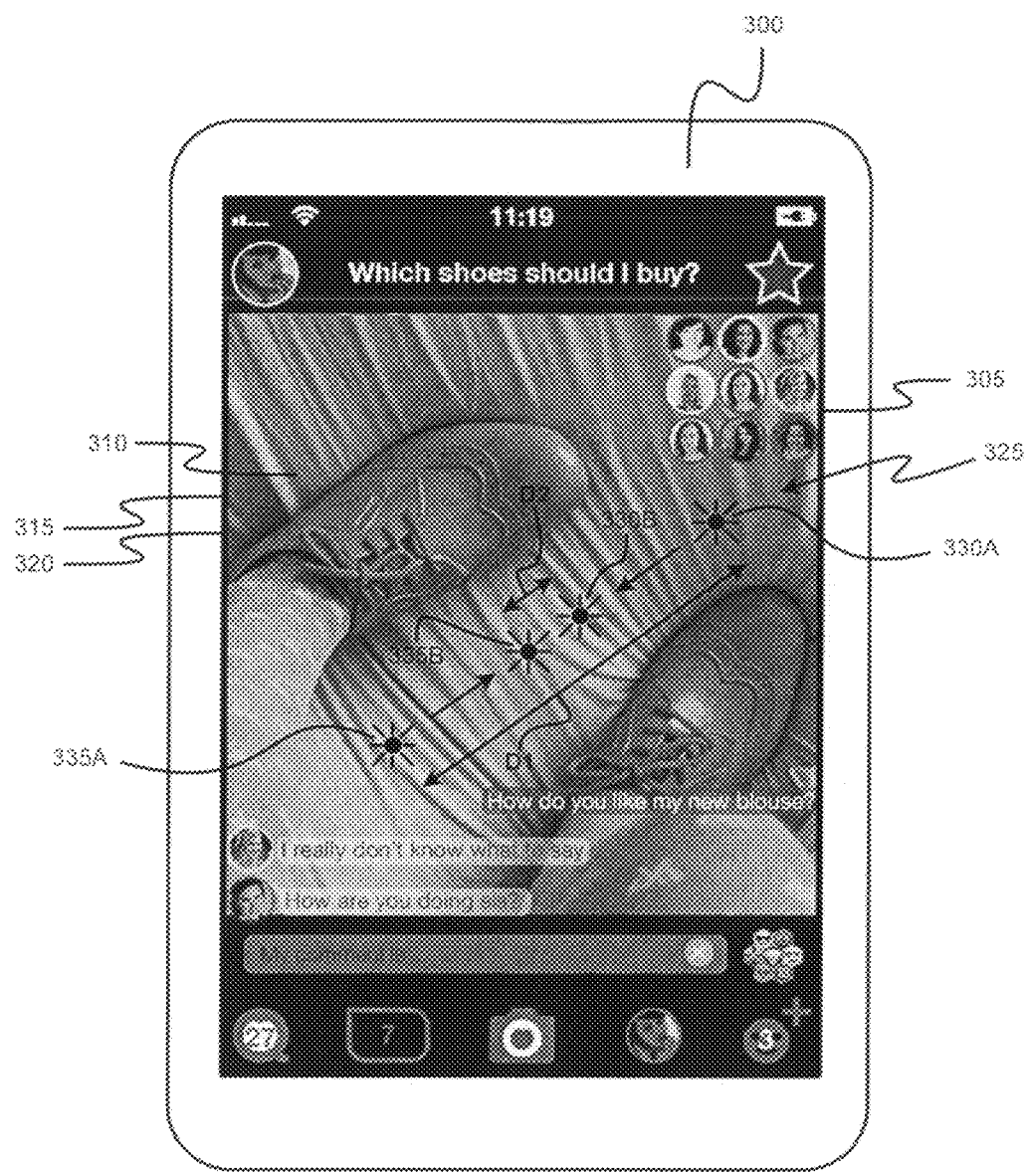
FIG. 3 illustrates an alternative embodiment having an intuitive pinch-to-zero hand gesture operated on the graphical user interface of the user device.

FIG. 3 illustrates a depiction of an intuitive pinch-to-zero hand gesture 325 to remove, trash, down-vote or otherwise eliminate an entry from a contest on a recipient client device 300. A touch screen display or graphic user interface 305 detects a first contact 330A and a second contact 335A at a first distance D1 apart. A contact may refer to a tap as previously described, received by depressing (e.g. pushing down) a surface of the touch screen display 305 by one of the five digits of a hand (i.e., one of four fingers or a thumb). The touch screen display 305 may also recognize the presence and contact of a digit or stylus through electrical conductivity or other suitable method. Here, a first digit, such as an index finger, may touch the touch screen display 305 at the first contact 330A and a second digit, such as a thumb, may touch the touch screen display 305 at the second contact 335A. As shown in FIG. 3, the first contact 330A and the second contact 335A are depicted for the sake of explanation only, in use there may or may not be a physical indicator of whether a contact has occurred.

When the first contact 330A and the second contact 335A are disposed within a tap region 320 of the entry 310, the client device 300 will recognize the hand gesture 325 is associated with the entry 310 and will continue to track where both digits are located. To complete the hand gesture 325, while both the first and second digit are in contact with the display 305, the user would naturally pinch their digits together, such that the first digit would move to a third contact 330B and the second digit would move to a fourth contact 335B, separated by a second distance D2. When the client device 300 detects whether the second distance D2 is below a predetermined minimum threshold distance, it will trigger removal or deletion of the entry 310.

During the pinch-to-zero hand gesture, a size of the entry may scale to reflect the decreasing distance of the two digits. The scaling of the image may be correlated to the distance such that the entry 310 is almost shrunk to a very small or zero size at the point the distance crosses the predetermined minimum threshold distance. In addition, the client device 300 may alert the user with an auditory or tactile feedback upon removal or deletion of the entry 310.

Figure 4:
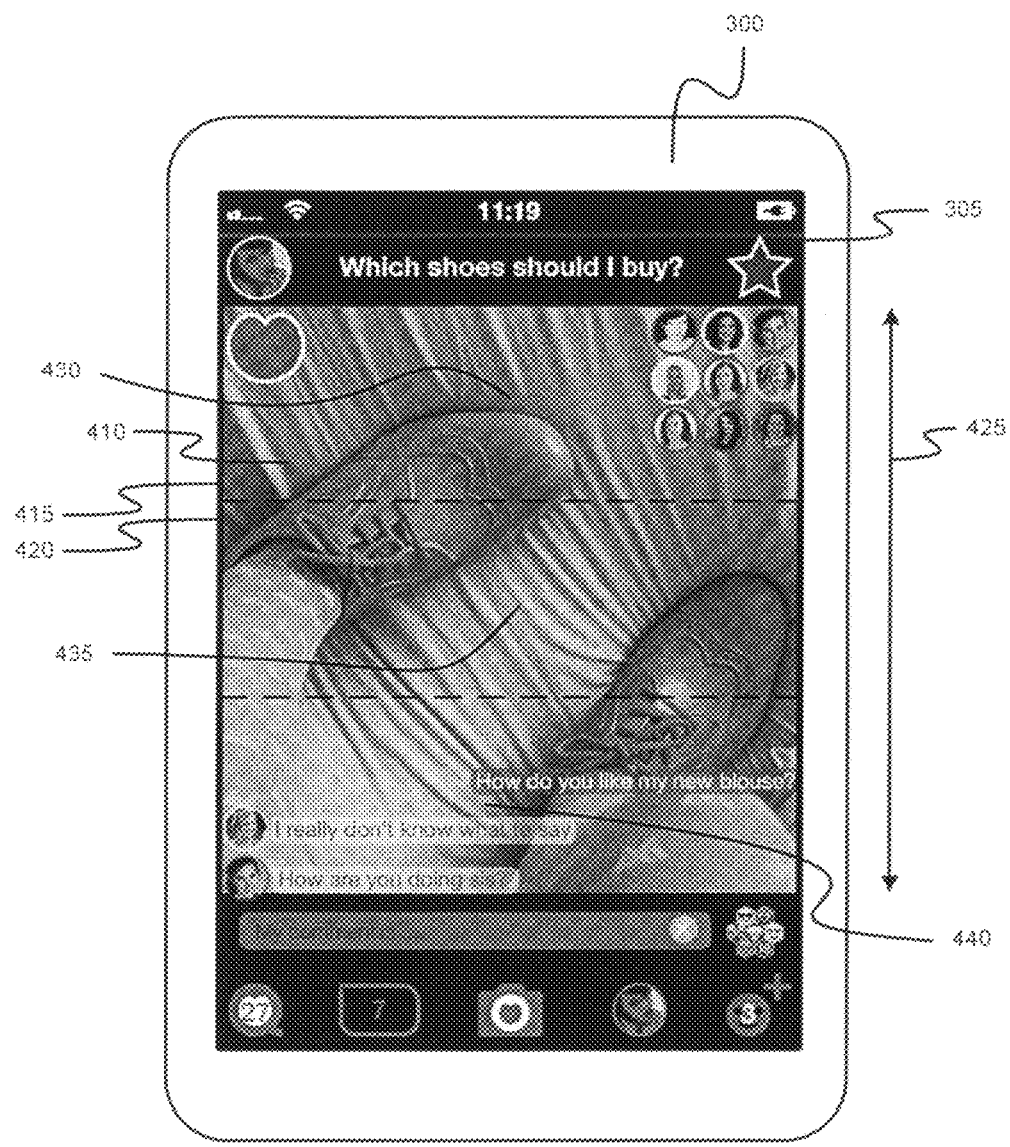
FIG. 4 shows a further embodiment having a rating input scale for a contest entry.

FIG. 4 shows another embodiment of the graphical user interface 305 further comprising a rating input scale 425 for receiving a rating corresponding to an entry. The graphical user interface or touch screen display 305 presents a first entry 410 out of a set of entries that are proposed to answer the question of the contest. The first entry 410 has a visibility region 415 and a tap region 420. The visibility region 415 encompasses a first area of the entry and the tap region 420 encompasses a second area of the entry. The first area and the second area may comprise the same area.

The rating input scale 425 is an intuitive method of rating an entry, as a user will tap on a higher region 430 of the entry 410 to give the entry a high rating. The user will tap on a lower region 440 of the entry 410 to give the entry a low rating. The user will tap on a middle region 435 of the entry 410 to give the entry a middle rating. As such, the rating input scale 425 may divide the tap region 420 of the entry 410 into a plurality of rating regions that span a width of the tap region 420. It is to be understood that the plurality of rating regions may comprise any number of rating regions. The plurality of rating regions is linearly arranged from a lower edge of the tap region 420 to an upper edge of the tap region 420, each corresponding to a different rating that scales with a vertical location of the rating region.

The rating input scale 425 may also be a continuous rating scale, wherein the application will first determine a location of a tap of the user, determine whether the location is within the tap region 420, and then calculate a rating based on a ratio of a vertical component of the location to a height of the entry 410. For example, if a user taps towards the upper edge of the entry 410, nine-tenths the distance from the lower edge of the entry 410, then the application will determine that the user would give the entry 410 a rating of 90%.

Furthermore, the tap region 420 of the entry 410 may represent a two dimensional voting scheme. For example, a width of the entry 410 may correspond to a first rating of a first attribute or emotion, while a height of the entry 410 may correspond to a second rating of a second attribute or emotion. In this case, for exemplary purposes only, a lower left corner of the entry 410 may correspond to a low rating for both the first and second rating, while an upper right corner of the entry 410 may correspond to a high rating for both the first and second rating. An upper left corner of the entry 410 may correspond to a low rating for the first rating and a high rating of the second rating, and vice versa for a lower right corner of the entry 410.

FIGS. 5A and 5B depict a further embodiment of the graphical user interface 305 displaying various user inputs to allow a user to provide feedback on a particular entry 505 or contest. As shown in FIG. 5A, the graphical user interface 305 may have a comment input field 510, an emoji input selection 515 and a reaction shot button 520. Each input field or button 510, 515 and 520 are displayed over or near the entry 505. If the user taps or clicks the reaction shot button 520, the application records an object ID of the entry 505 that the reaction shot button 520 corresponds to.

As shown in FIG. 5B, the application then turns on a camera of the user client device 300 and allows the user to take a reaction shot 525, either a photo or a short video, received from the camera. Alternatively, the user may select a photo or video representing their reaction by selecting a viewer button 530. The photo or video may be one the user had previously taken or one from a set of preexisting images either stored on the client device 300 or on an online service. The reaction shot 525 provides an easy method to provide the creating user either insightful or amusing feedback on a particular entry.

After taking the reaction shot 525, the application sends a user ID corresponding to the user, the object ID, and the reaction shot 525 to at least one of the social messaging service 110 and another client device 120, 130 via the communications network 140. If a privacy policy or setting is enabled, then the reaction shot 525 will be viewable by any user with access to see the reaction shot 525. In an alternative embodiment, the reaction shot 525 is sent first to a screening module, either a moderator, administrator, or screening system, before being sent to the social messaging service 110 or client devices 120, 130. When viewed by another client device 120, 130, the reaction shot 525 is displayed over or near the corresponding object.

Referring back to FIG. 5A, particular entries or objects may either accept or not accept reaction shots from being associated with the object. If the object accepts reaction shots, an attribute corresponding to whether the object accepts reaction shots is stored in a database. If the application determines that a displayed object accepts reaction shots by way of the attribute, the graphical user interface 305 will display the reaction shot button 520. Otherwise, if the application determines the object does not accept reaction shots, the reaction shot button 520 will not be displayed, will be greyed out, or will have another suitable indication that the object does not accept reaction shots.

Figure 6:
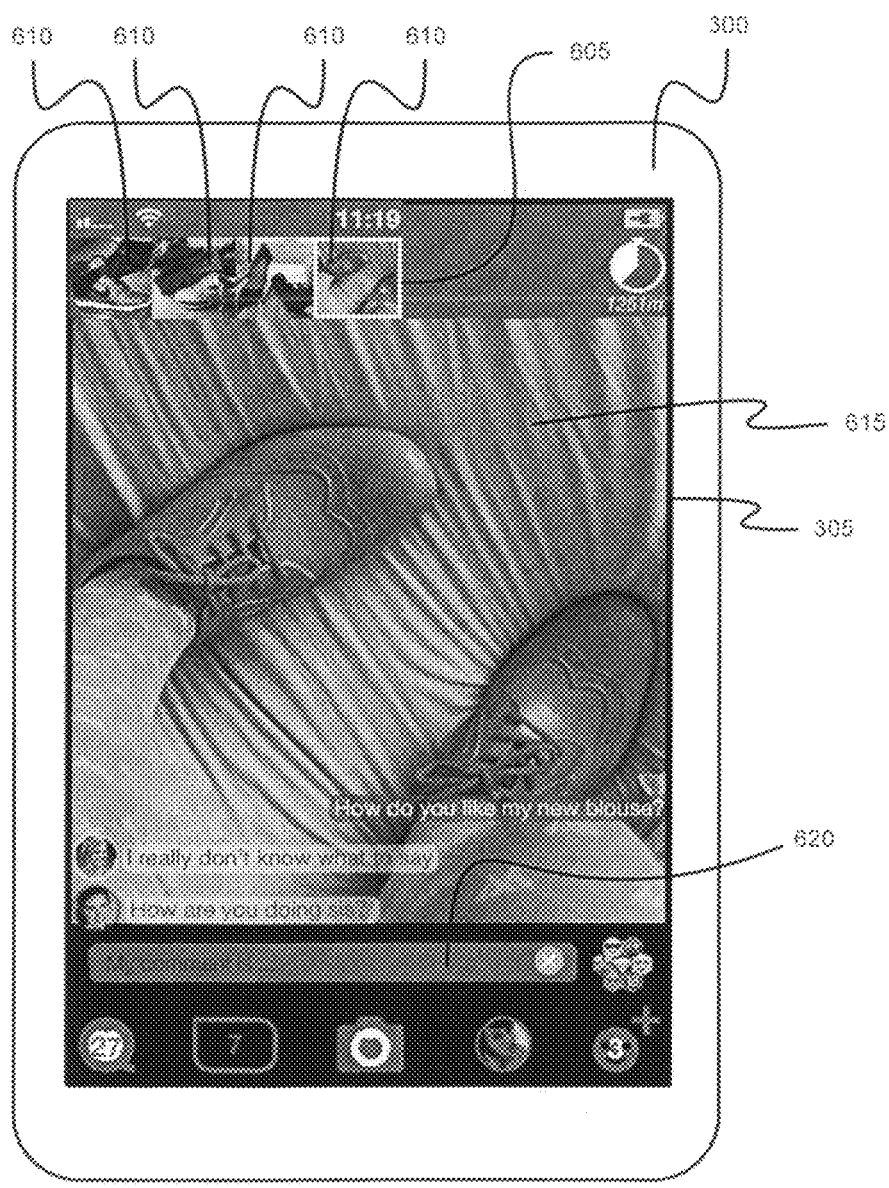
FIG. 6 depicts another embodiment having a carousel of a series of objects or entries on the graphical user interface of the user device.

FIG. 6 illustrates another embodiment of the graphical user interface 305 displaying a carousel 605 of a series of objects or entries 610 with an intelligent auto-advance system. The carousel 605 is a set of objects, the objects may be images, videos, or other suitable digital media as previously described herein.

When a user taps or clicks on a specific object 610, that object 610 may be prominently displayed in a main display window 615. Alternatively, the application may automatically advance through the objects 610. The application will display each object 610 in the main display window 615 for a predetermined amount of time. After the time has expired, the application will replace the currently displayed object 610 in the main display window 615 with the next object 610. The display of the carousel 605 may also cycle through a set of smaller display icons, such that the next object is displayed at either end of the carousel 605. The application allows the user or client device 300 to mark a start object and an end object to select where the carousel 605 will start and end, respectively. In one embodiment, the start and end object are the same object. Furthermore, the start and end object may also be an object the user has selected or voted on.

The user may interrupt the auto-advance if they wish to pause at a particular object. If the user taps or clicks anywhere on the screen, or alternatively within the main display window 615, the application will pause or stop the auto-advance for a separate predetermined length of time. Alternatively, if the user begins to enter a comment in a comment input field 620, the application will pause or stop the auto-advance. In addition, if the user initiates a selection or vote, either by double tapping the screen or using the rating scale 425 as shown in FIG. 4, the application may determine the currently displayed object as a default location of the carousel 605 and pause or stop the auto-advance until restarted.

Figure 7:
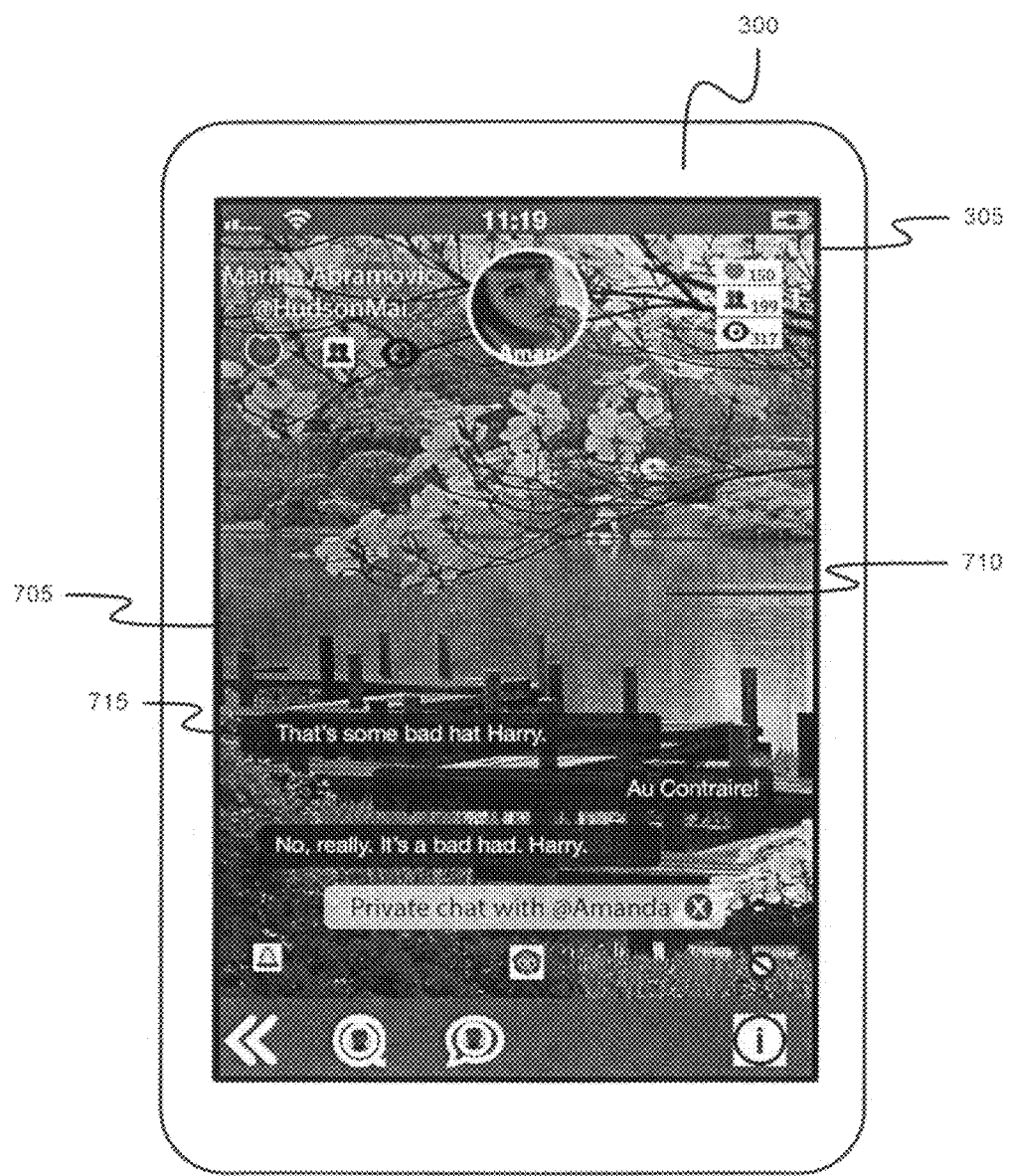
FIG. 7 depicts another alternative embodiment having a chat window and a background image.

FIG. 7 depicts a further embodiment of the graphical user interface 305 displaying a chat window 705 and a background image 710. The background image 710 is unique to the particular chat window 705 associated with a chat 715 between two or more users. The unique background image 710 clearly distinguishes one chat window or room 705 with another to prevent a user from mistakenly typing into the chat window 705 under the false pretense that it was, in fact, a separate chat window with different users. The background image 710 corresponds to the particular chat window 705 and may correspond to the topic of that chat 715 or, in the event of a one-to-one chat, may correspond to an image of the other user. For example, if the chat 715 is about a particular location, the background image 710 may be a photo of the location. The background image 710 is selected by the initiator of the chat 715 or by the application.

The chat 715 overlays the background image 710. However, if the user wishes to see the background image 710 without the chat 715 overlay, they may tap the background image 710 to temporarily remove the chat 715 from the graphical user interface 305. In addition, the chat 715 may remain removed while the user continues the tap, for example by holding their digit against the touch screen display.

In another embodiment, the application allows the user to manipulate the background image 710 with other hand gestures. The user may use two digits simultaneously in contact with the background image 710 to rotate, pan, zoom or otherwise shrink the background image 710 based upon the location of each digit. For example, if a user places two fingers on the touch screen display, and subsequently moves them apart such that a distance between each finger increases, the background image 710 may zoom in, or increase in size.

Method of Operation

Figure 8:
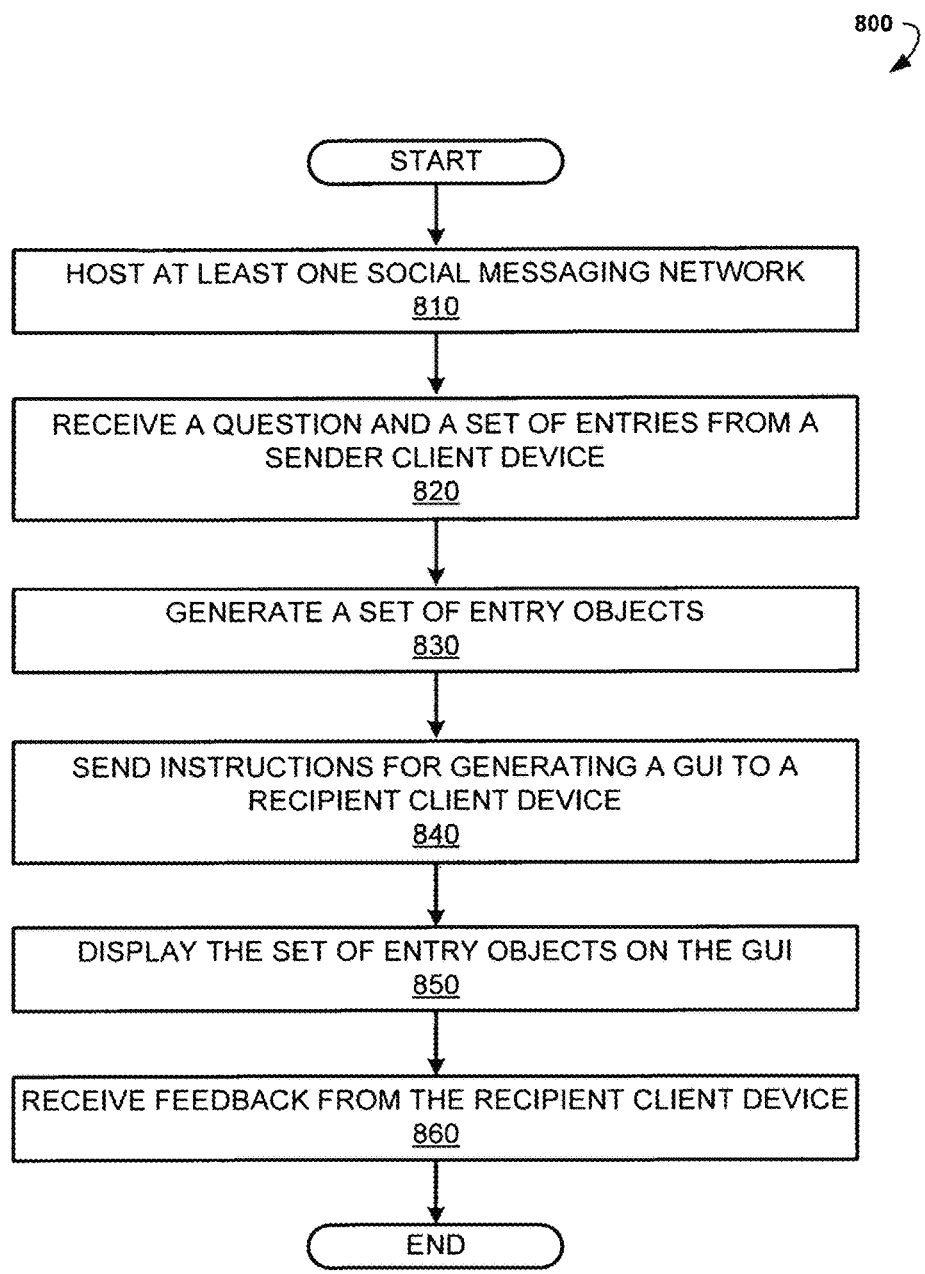
FIG. 8 is a process flow diagram showing a method for implementing a social messaging network.

FIG. 8 is a process flow diagram showing a method 800 for implementing a social messaging network. The method 800 may be performed by processing logic that may comprise hardware (e.g., decision making logic, dedicated logic, programmable logic, and microcode), software (such as software run on a computer system or a dedicated machine), or a combination of both. In one example embodiment, the processing logic may reside at the social messaging service 110 or the client devices 120, 130. The method 800 may be performed by various components discussed herein above as shown in FIGS. 1-7. It is to be understood that method 800 may be used independently of, or in conjunction with, any of the other methods described in the present disclosure.

The method 800 may commence at operation 810 with the social messaging service 110, which hosts at least one social messaging network in communication with a sender client device, a communications network and at least one recipient client device. The social messaging network may also comprise a database or memory, which contains data and information associated with users, contests, contest entries, entry object ID's, user ID's, lists of friends of each user, geo-regions, age-cohorts, and other information as described above.

At operation 820, the social messaging service 110 receives a question and a set of entries from a sender client device 120. The set of entries may comprise photos, videos or other forms of digital media.

At operation 830, the social messaging service 110 may generate a set of entry objects based upon the set of entries received from the sender client device 120. Each entry object represents a particular answer to the question, and comprises a visibility region and a tap region. Alternatively, the social messaging service 110 may receive the entry objects directly from the sender client device 120.

At operation 840, the social messaging service 110 sends instructions for generating a graphical user interface ("GUI") to a recipient client device 130.

At operation 850, the recipient client device 130 displays the set of entry objects on the GUI. A recipient user may now operate the GUI as previously discussed herein, and ultimately vote on which entry answers the question.

At operation 860, the social messaging service 110 receives feedback from the recipient client device 130. The feedback may comprise one or more up-votes, down-votes, comments, reaction shots, additional entries, elimination of entries, or other data as described above.

Figure 9:
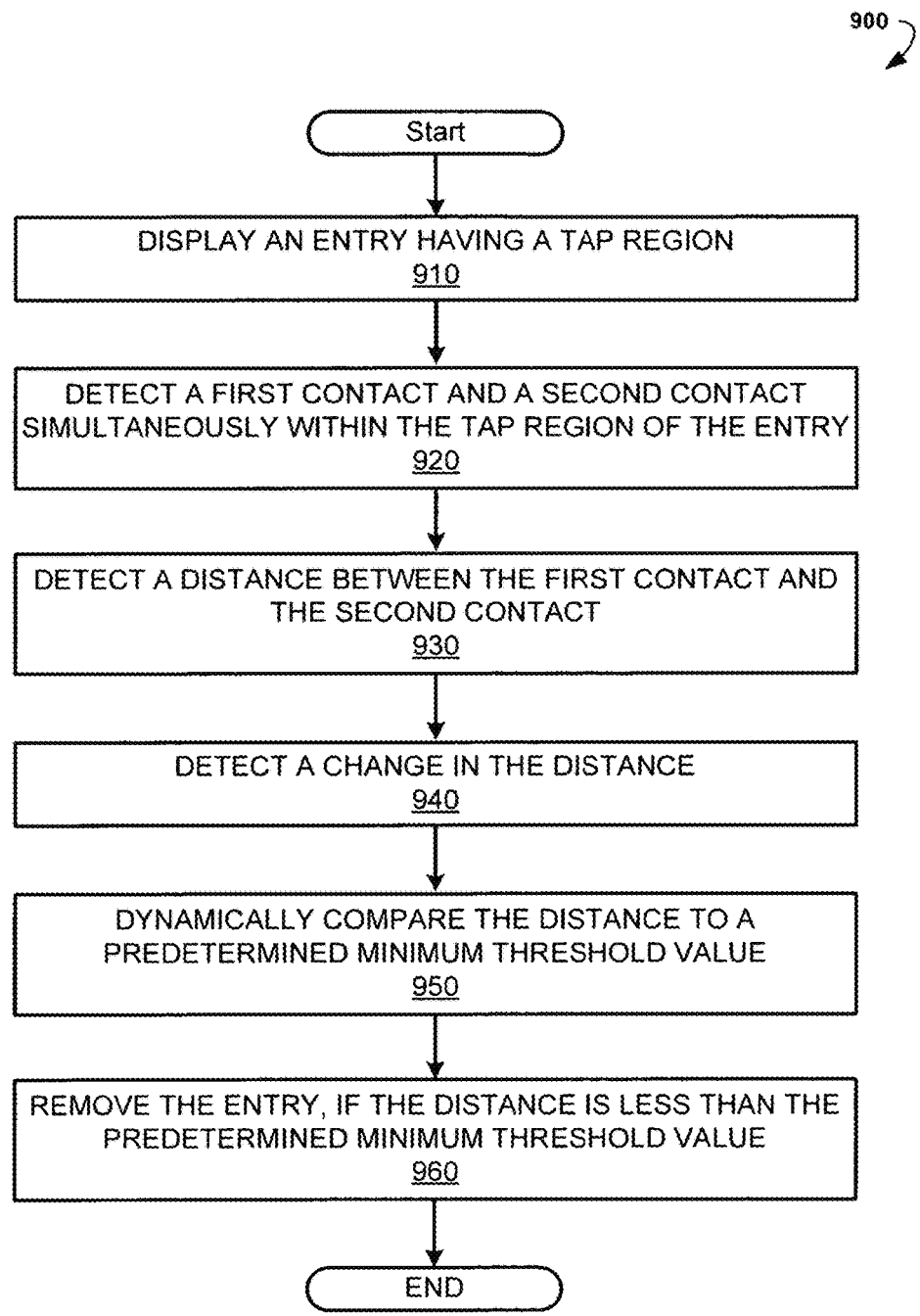
FIG. 9 is a process flow diagram showing a method for removing an entry from a contest.

FIG. 9 is a process flow diagram showing a method 900 for removing an entry from a contest on a touch screen display using a hand gesture. The method 900 may be performed by processing logic that may comprise hardware (e.g., decision making logic, dedicated logic, programmable logic, and microcode), software (such as software run on a computer system or a dedicated machine), or a combination of both. In one example embodiment, the processing logic may reside at the social messaging service 110 or the client devices 120, 130. The method 900 may be performed by various components discussed herein above as shown in FIGS. 1-7. It is to be understood that method 900 may be used independently of, or in conjunction with, any of the other methods described in the present disclosure.

The method 900 may commence at operation 910 with a recipient client device 130 operated by an application or set of instructions to display an entry for a contest on a touch screen display. The entry has a visibility region and a tap region.

At operation 920, the application detects a first contact and a second contact simultaneously within the tap region of the entry. The first contact and second contact may be a first tap and a second tap, respectively, either as a result of a user pressing a digit or stylus against the touch screen display.

At operation 930, the application detects a distance between the first contact and the second contact.

At operation 940, the application detects a change in the distance.

At operation 950, the application dynamically compares the distance to a predetermined minimum threshold value. The predetermined minimum threshold value may correspond to a distance between two touching digits.

At operation 960, if at operation 950 the application determines that the distance is less than the predetermined minimum threshold value, the application removes the entry from the contest as displayed on the recipient client device 130. However, the entry remains in the database of the social messaging service 110, and may remain in other recipient client devices 130.

Figure 10:
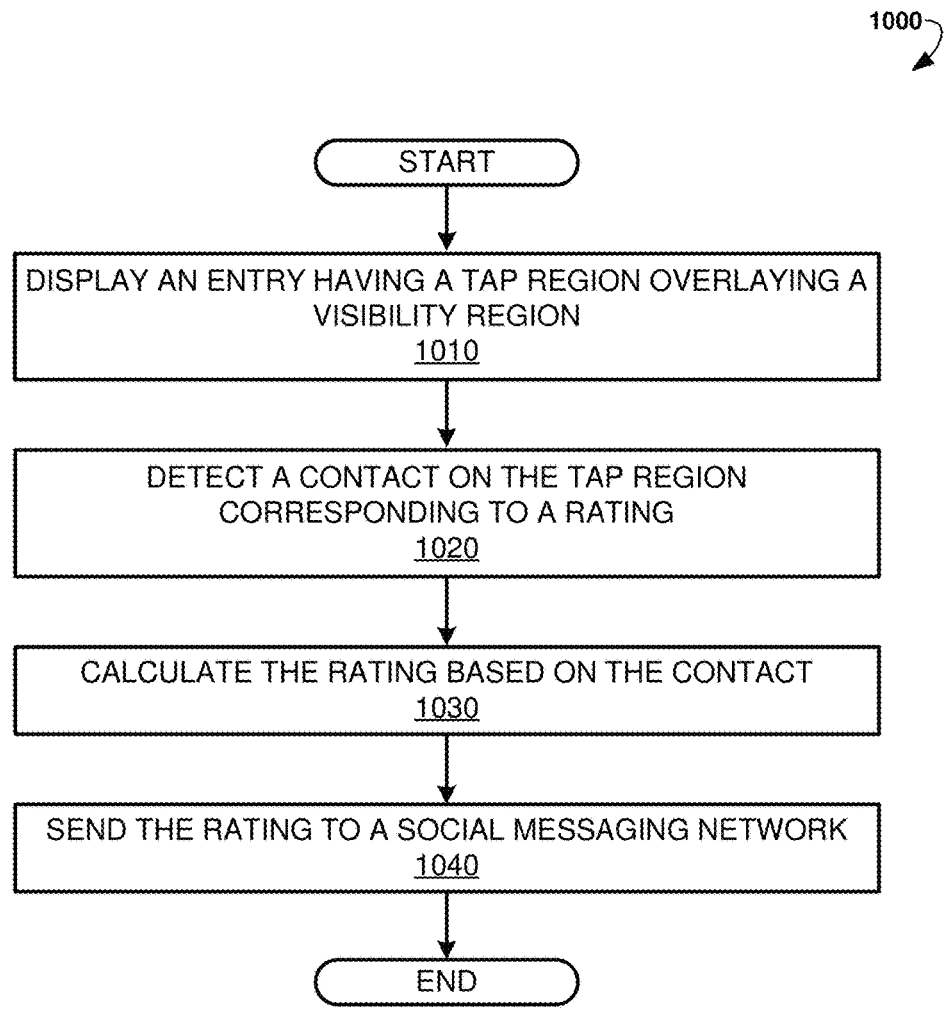
FIG. 10 is a process flow diagram showing a method for rating an entry from a contest.

FIG. 10 is a process flow diagram showing a method 1000 for rating an entry in a contest by clicking or tapping on the underlying entry itself. The method 1000 may be performed by processing logic that may comprise hardware (e.g., decision making logic, dedicated logic, programmable logic, and microcode), software (such as software run on a computer system or a dedicated machine), or a combination of both. In one example embodiment, the processing logic may reside at the social messaging service 110 or the client devices 120, 130. The method 1000 may be performed by various components discussed herein above as shown in FIGS. 1-7. It is to be understood that method 1000 may be used independently of, or in conjunction with, any of the other methods described in the present disclosure.

The method 1000 may commence at operation 1010 with a recipient client device 130 operated by an application or set of instructions to display an entry for a contest on a touch screen display. The entry has a tap region that overlays a visibility region, the visibility region depicting at least one of a photo, video, text or other suitable digital media.

At operation 1020, the application detects a contact on the tap region corresponding to a rating. The contact, as previously described, may be a tap on a touch screen display, a click from a computer mouse on a graphical user interface, or other suitable user input interaction.

At operation 1030, the application calculates the rating based on a location of the contact. The application may calculate the rating based upon one or more of: a vertical component and a horizontal of the location, a height and a width of the entry object, and a plurality of rating regions uniformly distributed on the tap region.

At operation 1040, the application sends the rating to the social messaging network 110. The application may send the rating, along with other information regarding the contest, to the social messaging network 110 through the communication network 140.

Figure 11:
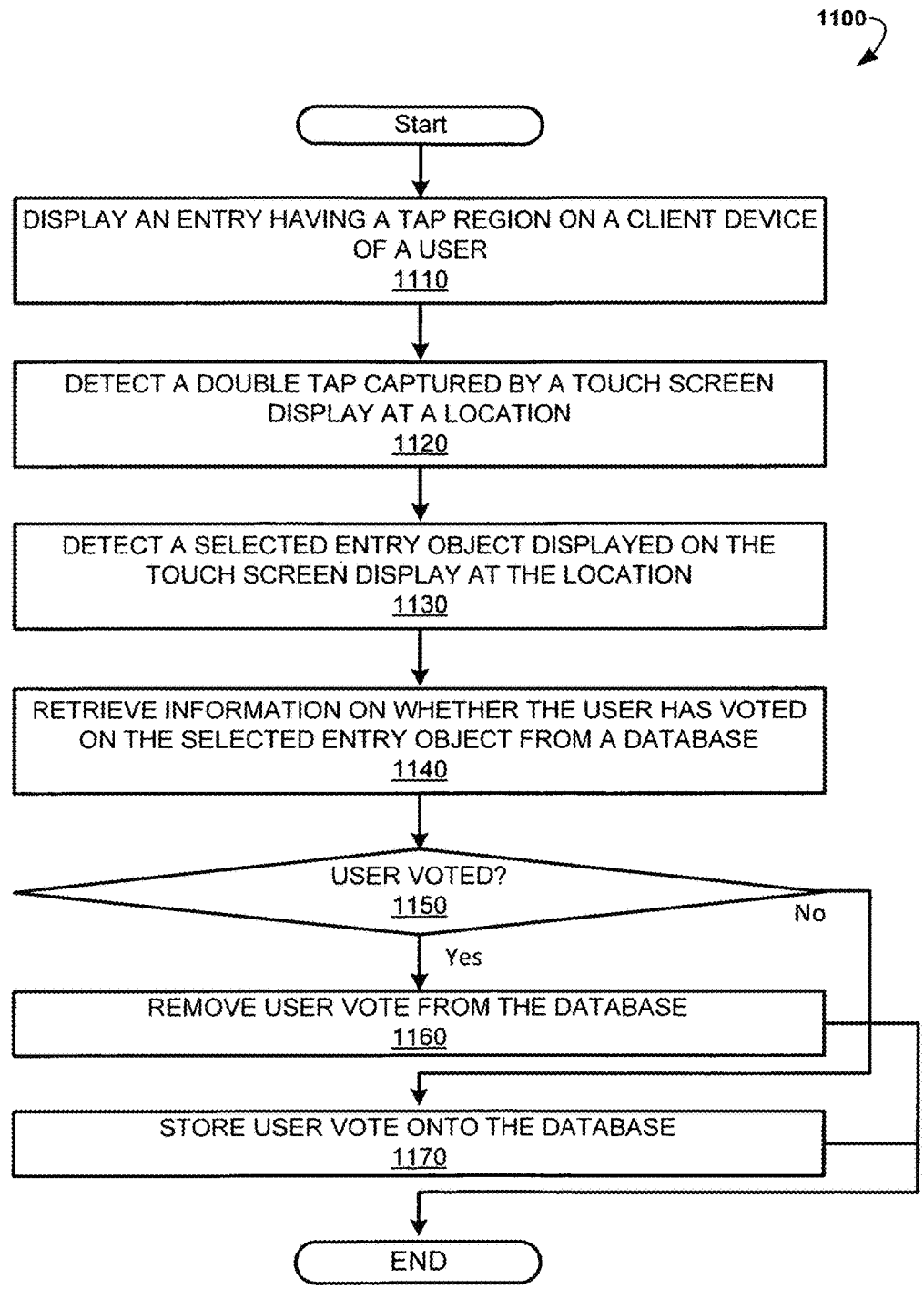
FIG. 11 is a process flow diagram showing a method for toggling a vote on an entry for a contest.

FIG. 11 is a process flow diagram showing a method 1100 for toggling a vote on an entry for a contest. The method 1100 may be performed by processing logic that may comprise hardware (e.g., decision making logic, dedicated logic, programmable logic, and microcode), software (such as software run on a computer system or a dedicated machine), or a combination of both. In one example embodiment, the processing logic may reside at the social messaging service 110 or the client devices 120, 130. The method 1100 may be performed by various components discussed herein above as shown in FIGS. 1-7. It is to be understood that method 1100 may be used independently of, or in conjunction with, any of the other methods described in the present disclosure.

The method 1100 may commence at operation 1110 with a recipient client device 130 operated by an application or set of instructions to display an entry for a contest on a touch screen display. The entry has a tap region.

At operation 1120, the application detects a double tap captured by the touch screen display at a location. The double tap, for example, may comprise a first contact and a subsequent second contact, the first contact and the second contact disposed at substantially the same location on the touch screen display, wherein a length of time between the first contact and the second contact is below a minimum threshold duration.

At operation 1130, the application detects a selected entry object displayed on the touch screen display at the location. The application references the selected entry object by an object ID.

At operation 1140, the application retrieves information on whether the user has voted on the selected entry object from a database. The database may be associated with the social messaging service 110. The information may be a Boolean reference, or may be associated with a rating, and is linked to the object ID of the entry object.

At operation 1150, the application determines whether the user has voted on the entry using the information received at operation 1140.

At operation 1160, if at operation 1150 the application determines that the user has already voted on the entry, the application will remove the user vote from the database.

At operation 1170, if at operation 1150 the application determines that the user has not previously voted on the entry, the application will store the user vote onto the database.

Figure 12:
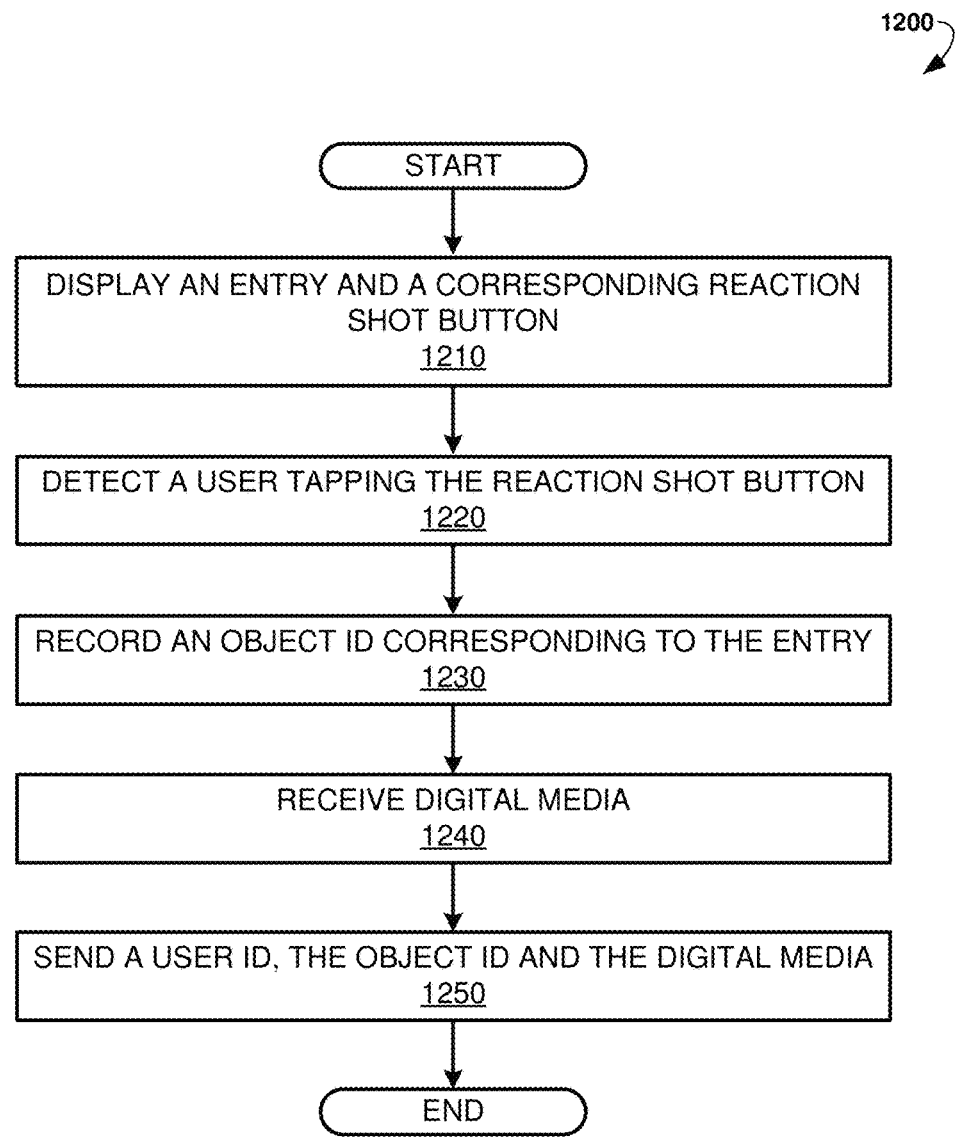
FIG. 12 is a process flow diagram showing a method for generating a reaction shot to an entry in a contest.

FIG. 12 is a process flow diagram showing a method 1200 for generating a reaction shot to an entry in a contest. The method 1200 may be performed by processing logic that may comprise hardware (e.g., decision making logic, dedicated logic, programmable logic, and microcode), software (such as software run on a computer system or a dedicated machine), or a combination of both. In one example embodiment, the processing logic may reside at the social messaging service 110 or the client devices 120, 130. The method 1200 may be performed by various components discussed herein above as shown in FIGS. 1-7. It is to be understood that method 1200 may be used independently of, or in conjunction with, any of the other methods described in the present disclosure.

The method 1200 may commence at operation 1210 with a client device 120, 130 operated by an application or set of instructions to display an entry for a contest and a corresponding reaction shot button on a graphical user interface.

At operation 1220, the application detects a user tapping or clicking the reaction shot button.

At operation 1230, the application records an object ID corresponding to the entry.

At operation 1240, the application receives digital media, such as an image, video, audio or other suitable form of digital media. The application receives the digital media from either a camera of the client device 120, 130 or from a list of preexisting images stored either on the client device 120, 130 or on an online service.

At operation 1250, the application sends a user ID associated with the user, the object ID and the reaction shot or digital media to the social messaging service 110 or other user client devices 120, 130 via the communication network 140.

In one embodiment, the application sends the user ID, the object ID and the reaction shot to particular user client devices 120, 130 based upon a permitted table of approved client devices stored on a database or memory. If so, the application may first receive the table of approved client devices from the social messaging service 110 based upon the user ID and the object ID.

Figure 13:
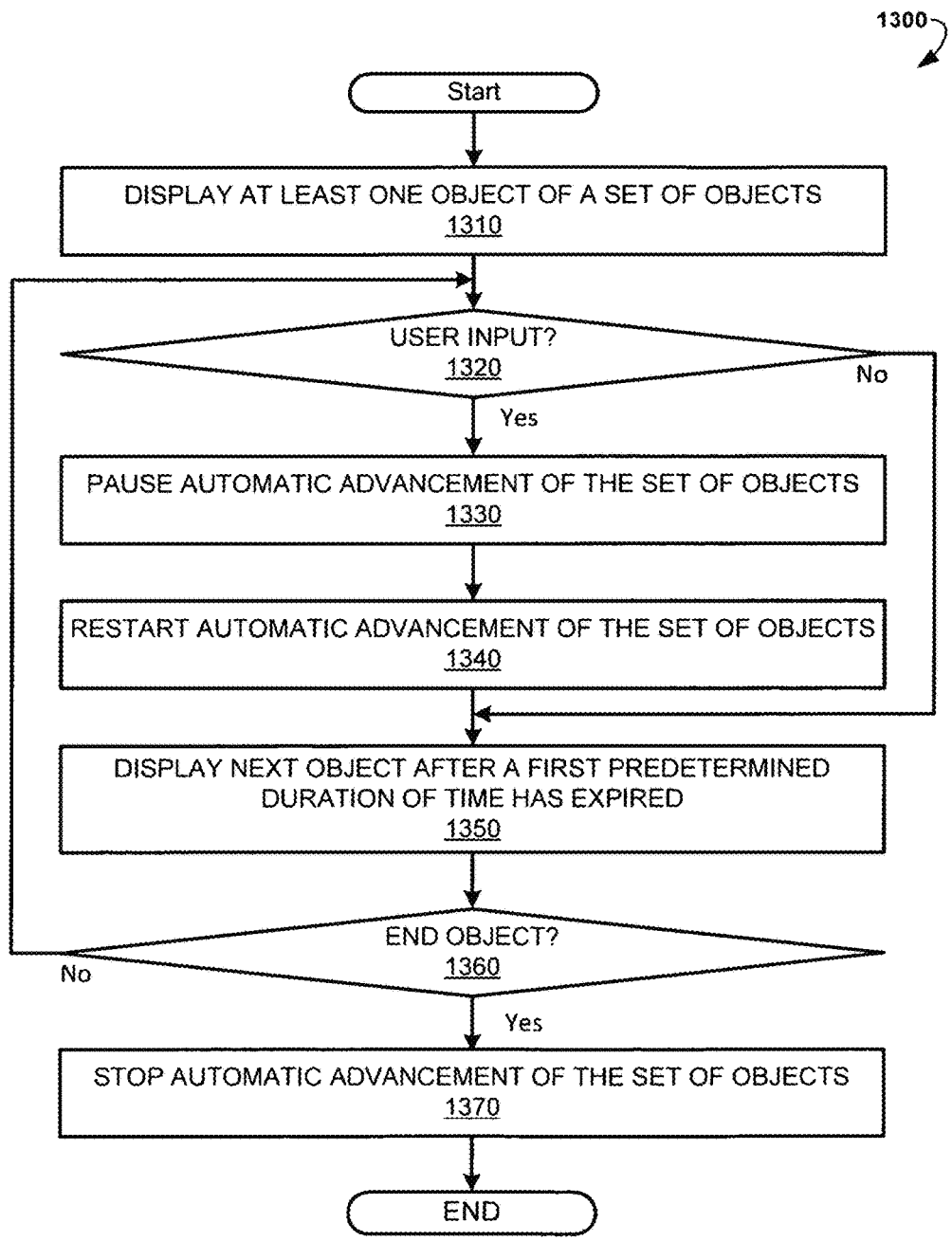
FIG. 13 is a process flow diagram showing a method for intelligently and automatically advancing through a set of objects in a carousel

FIG. 13 is a process flow diagram showing a method 1300 for intelligently and automatically advancing through a set of objects in a carousel. The method 1300 may be performed by processing logic that may comprise hardware (e.g., decision making logic, dedicated logic, programmable logic, and microcode), software (such as software run on a computer system or a dedicated machine), or a combination of both. In one example embodiment, the processing logic may reside at the social messaging service 110 or the client devices 120, 130. The method 1300 may be performed by various components discussed herein above as shown in FIGS. 1-7. It is to be understood that method 1300 may be used independently of, or in conjunction with, any of the other methods described in the present disclosure.

The method 1300 may commence at operation 1310 with a recipient client device 130 operated by an application or set of instructions to display at least one object of a carousel, or a set of objects, on a graphical user interface. The objects may correspond to entries or shots in a contest, and may either be received from the social messaging service 110 or generated by the recipient client device 130 as previously described herein. The application may also display the other objects in the carousel as smaller icons. The first object displayed is a start object.

At operation 1320, the application determines whether the user has interacted with the client device 130 or has provided any input. After operation 1310, the graphical user interface will display the objects, one at a time, with a first predetermined duration of time disposed between displaying one object from the next object. The application will determine whether the user has interacted with the client device 130 within the first predetermined duration between objects.

The first predetermined duration of time may be different depending on what type of digital media comprises the objects. For example, if the objects are still images, the first predetermined duration may be less than thirty seconds per image, or other suitable duration. If the objects are audio or video, the first predetermined duration may be a suitable duration to play the entire audio or video. If the object comprises text, the first predetermined duration may be calculated dependent upon the number of characters, letters or words within the object.

At operation 1330, the application pauses or stops the automatic advancement of the set of objects. The application will pause or stop the automatic advancement immediately after the operation 1320, to prevent the application from moving onto the next object while the user is either commenting on, double tapping on, or otherwise interacting with the previous object.

At operation 1340, the application will restart the automatic advancement of the set of objects. The application may restart the automatic advancement after a second predetermined duration of time has expired. Alternatively, the application may pause the automatic advancement until the user interacts with the graphical user interface and expresses a desire to restart the automatic advancement.

At operation 1350, the application displays the next object after the first predetermined duration of time has expired.

At operation 1360, the application determines whether the currently displayed object is the end object of the carousel. If the application determines that the currently displayed object is not the end object, the application will proceed to operation 1320 to detect user input.

At operation 1370, if at operation 1360 the application determines that the currently displayed object is the end object, the application will stop the automatic advancement of the set of objects.

Computer Architecture

Figure 14:
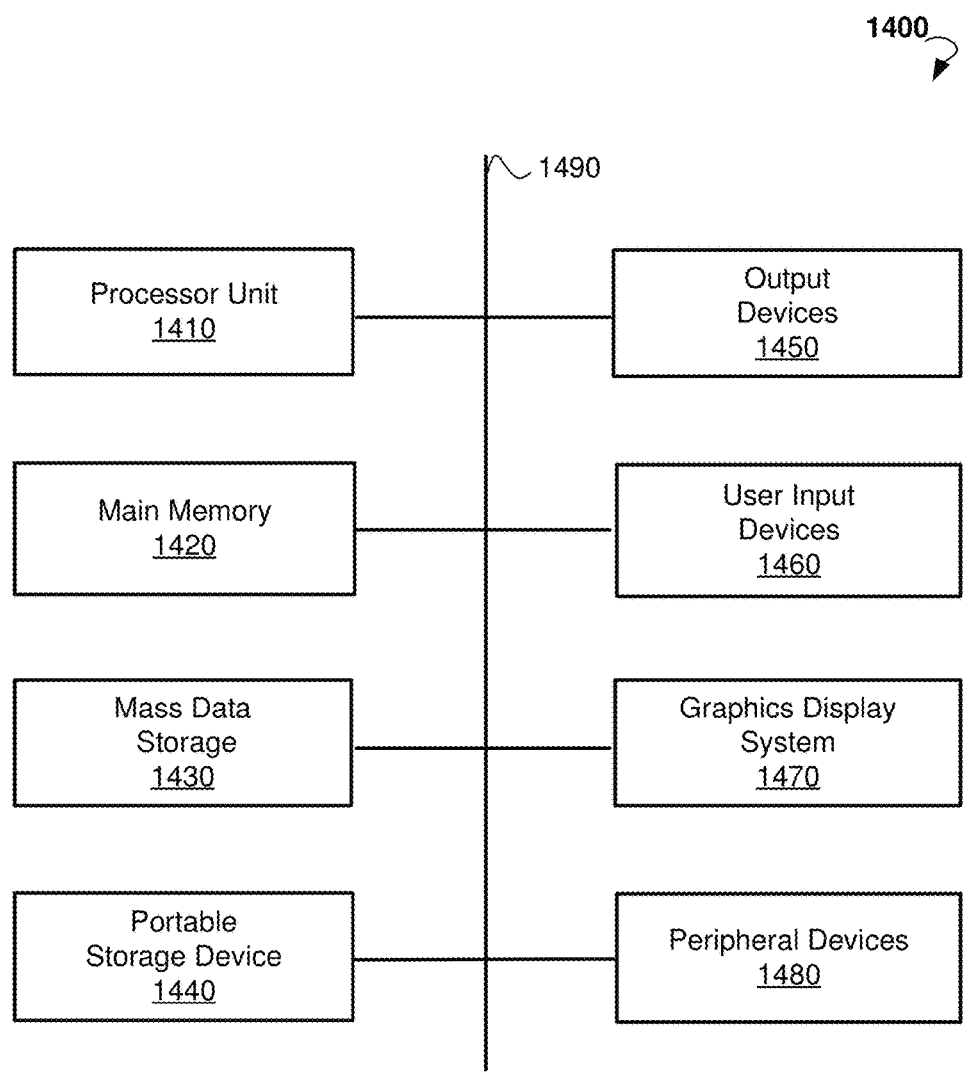
FIG. 14 is a block diagram of an example computer system that may be used to implement embodiments of the present disclosure.

FIG. 14 illustrates an exemplary computer system 1400 that may be used to implement some embodiments of the present invention. The computer system 1400 of FIG. 14 may be implemented in the contexts of the likes of computing systems, networks, servers, or combinations thereof. The computer system 1400 of FIG. 14 includes one or more processor units 1410 and main memory 1420. Main memory 1420 stores, in part, instructions and data for execution by processor units 1410. Main memory 1420 stores the executable code when in operation, in this example. The computer system 1400 of FIG. 14 further includes a mass data storage 1430, portable storage device 1440, output devices 1450, user input devices 1460, a graphics display system 1470, and peripheral devices 1480.

The components shown in FIG. 14 are depicted as being connected via a single bus 1490. The components may be connected through one or more data transport means. Processor unit 1410 and main memory 1420 is connected via a local microprocessor bus, and the mass data storage 1430, peripheral device(s) 1480, portable storage device 1440, and graphics display system 1470 are connected via one or more input/output (I/O) buses.

Mass data storage 1430, which can be implemented with a magnetic disk drive, solid state drive, or an optical disk drive, is a non-volatile storage device for storing data and instructions for use by processor unit 1410. Mass data storage 1430 stores the system software for implementing embodiments of the present disclosure for purposes of loading that software into main memory 1420.

Portable storage device 1440 operates in conjunction with a portable non-volatile storage medium, such as a flash drive, floppy disk, compact disk, digital video disc, or Universal Serial Bus (USB) storage device, to input and output data and code to and from the computer system 1400 of FIG. 14. The system software for implementing embodiments of the present disclosure is stored on such a portable medium and input to the computer system 1400 via the portable storage device 1440.

User input devices 1460 can provide a portion of a user interface. User input devices 1460 may include one or more microphones, an alphanumeric keypad, such as a keyboard, for inputting alphanumeric and other information, or a pointing device, such as a mouse, a trackball, stylus, or cursor direction keys. User input devices 1460 can also include a touchscreen. Additionally, the computer system 1400 as shown in FIG. 14 includes output devices 1450. Suitable output devices 1450 include speakers, printers, network interfaces, and monitors.

Graphics display system 1470 include a liquid crystal display (LCD) or other suitable display device. Graphics display system 1470 is configurable to receive textual and graphical information and processes the information for output to the display device.

Peripheral devices 1480 may include any type of computer support device to add additional functionality to the computer system.

The components provided in the computer system 1400 of FIG. 14 are those typically found in computer systems that may be suitable for use with embodiments of the present disclosure and are intended to represent a broad category of such computer components that are well known in the art. Thus, the computer system 1400 of FIG. 14 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, and other suitable operating systems.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A system for implementing a social messaging network, the system comprising:
    a processor; and
    a memory coupled to the processor, the memory storing instructions which are executable by the processor to perform a method comprising:
        hosting at least one social messaging network;
        receiving a question from a sender client device;
        generating a set of answer objects, each answer object having a visibility region and a tap region, the tap region having a plurality of rating regions overlaying the visibility region, the plurality of rating regions corresponding to a plurality of ratings;
        sending instructions for generating a graphical user interface to at least one recipient client device;
        displaying the set of answer objects on the graphical user interface; and
        receiving feedback from the at least one recipient client device.

2. The system according to claim 1, wherein the feedback comprises a rating of at least one of the set of answer objects.

3. The system according to claim 1, further comprising instructing the at least one recipient client device to remove at least one answer object from the set of answer objects in response to a touch gesture.

4. The system according to claim 3, wherein the instructing the at least one recipient client device further comprises:
    detecting a first contact and a second contact of a touch screen display of the at least one recipient client device simultaneously, the first contact and second contact disposed within the tap region of an answer object;
    detecting a distance between the first and second contact;
    detecting a change in the distance, wherein the distance is reduced below a predetermined minimum threshold value; and
    removing the answer object from the graphical user interface of the at least one recipient client device.

5. The system according to claim 1, wherein the feedback comprises an indication of whether the at least one recipient client device removed at least one answer object from the set of answer objects.

6. The system according to claim 5, further comprising storing information associated with each answer object, the information comprising a count of a number of recipient client devices that have removed the answer object.

7. A computer-implemented method for implementing a social messaging network, comprising:
    hosting, by a system coupled to at least one server and executable by a processor, at least one social messaging network;
    receiving, by the processor over a network, a question from a sender client device;
    generating, by the processor, a set of answer objects, each answer object having a visibility region and a tap region, the tap region having a plurality of rating regions overlaying the visibility region, the plurality of rating regions corresponding to a plurality of ratings;
    sending instructions for generating a first graphical user interface to at least one recipient client device having a touch screen display, the first graphical user interface including the set of answer objects;
    receiving, by the processor, feedback from the at least one recipient client device, the feedback comprising a reaction shot corresponding to an answer object of the set of answer objects, the reaction shot comprising at least one of an image and a video captured by a camera of the recipient client device; and sending instructions for generating a second graphical user interface to the sender client device, the second graphical user interface including the reaction shot overlaying the corresponding answer object.

8. The method according to claim 7, further comprising receiving a set of answers from the sender client device, wherein the set of answers includes at least one of an image and a video, and wherein the generating of the set of answer objects is based on the set of answers.

9. The method according to claim 7, wherein the feedback further comprises recipient user identification and object identification.

10. The method according to claim 7, further comprising sending the reaction shot to the sender client device and other permitted recipient client devices based on a table of approved recipient client devices.

11. The method according to claim 7, further comprising storing, in a database, attributes associated with each answer object, the attributes comprising the visibility region, the tap region, and whether the answer object accepts reaction shots.

12. The method according to claim 7, further comprising:
detecting a first contact and a subsequent second contact, the first contact and second contact disposed at the same location on the touch screen display, wherein a length of time between the first contact and the second contact is below a minimum threshold duration;
detecting a selected answer object displayed on the touch screen display at the location;
retrieving voting data from a database associated with the selected answer object, the voting data reflecting whether a user has voted on the selected answer object;
determining whether the user has voted on the selected answer object; and
selectively removing, if the user has voted on the selected answer object, the user vote from the database, and otherwise storing a user vote to the database.

13. The method according to claim 7, further comprising:
detecting a first contact and a subsequent second contact, the first contact and second contact disposed at the same location on the touch screen display, wherein a length of time between the first contact and the second contact is below a minimum threshold duration;
detecting a user avatar object displayed on the touch screen display at the location;
determining an object ID of the user avatar object selected; and
transmitting the object ID to a first list stored as a table in a database.

14. A non-transitory computer readable medium storing computer-executable instructions that, when executed, cause a processor to:
communicate, by the processor, with at least one social messaging network over a communications network;
receive, by the processor over via the communications network, at least one contest from a sender client device, the at least one contest comprising a question and at least one entry object having a visibility region and a tap region, the tap region having a plurality of rating regions overlaying the visibility region, each rating region corresponding to a different rating that scales with a vertical location of the rating region;
display, by the processor, the at least one entry object on a touch screen display; and
send, by the processor, at least one vote associated with one of the at least one entry object to the at least one social messaging network.

15. The non-transitory computer readable medium according to claim 14, further comprising:
detect a contact on a rating region of the plurality of rating regions of the tap region corresponding to a rating of the entry object;
calculate the rating based on a location of the contact; and
send the rating of the entry object to the social messaging network.

16. The non-transitory computer readable medium according to claim 15, wherein the calculation of the rating is based on at least one of a vertical component and a horizontal component of the location, a height and a width of the entry object, and the plurality of rating regions uniformly distributed in the tap region.

17. The non-transitory computer readable medium according to claim 14, further comprising the steps of:
detect a first contact and a second contact simultaneously, the first and second contact disposed within the tap region of the entry object;
detect a distance between the first contact and second contact;
detect a change in the distance, wherein the distance is reduced below a predetermined minimum threshold value; and
remove the entry object from the touch screen display.

18. The non-transitory computer readable medium according to claim 14, further comprising the steps of:
detect a first contact and a subsequent second contact, the first contact and second contact disposed at the same location on the touch screen display, wherein a length of time between the first contact and the second contact is below a minimum threshold duration;
detect a selected entry object displayed on the touch screen display at the location;
retrieve voting data from a database associated with the selected entry object, the voting data reflecting whether the user has voted on the selected entry object;
determine whether a user has voted on the selected entry object; and
selectively remove, if the user has voted on the selected entry object, the user vote from the database, and otherwise store a user vote to the database.

19. The non-transitory computer readable medium according to claim 14, further comprising the step of:
send feedback to the social messaging network, wherein the feedback comprises a recipient user identification, an object identification and a reaction shot, wherein the reaction shot comprises at least one of an image and a video and is associated with one of the at least one entry object.

* * * * *